US010082303B2

(12) United States Patent
Choi et al.

(10) Patent No.: US 10,082,303 B2
(45) Date of Patent: Sep. 25, 2018

(54) APPLIANCE FOR DEHUMIDIFICATION AND MULTI-FUNCTION APPLIANCE FOR DEHUMIDIFICATON OR HUMIDIFICATION

(71) Applicant: SAMSUNG ELECTRONICS CO., LTD., Suwon-si, Gyeonggi-do (KR)

(72) Inventors: Heung Seob Choi, Suwon (KR); Seong Ryeol Myeong, Suwon (KR); Jun Hyoun Kwon, Seoul (KR); Sung Woo Kim, Suwon (KR); Jung Ho Kim, Suwon (KR); Euy Sung Chu, Seongnam (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 14/938,147

(22) Filed: Nov. 11, 2015

(65) Prior Publication Data

US 2016/0131372 A1    May 12, 2016

(30) Foreign Application Priority Data

Nov. 12, 2014  (KR) .................. 10-2014-0157310
Jul. 13, 2015  (KR) .................. 10-2015-0098908

(51) Int. Cl.
  *F25D 21/14*   (2006.01)
  *F24F 3/14*    (2006.01)
  (Continued)

(52) U.S. Cl.
  CPC ........... *F24F 3/14* (2013.01); *B01D 53/0438* (2013.01); *B01D 53/261* (2013.01);
  (Continued)

(58) Field of Classification Search
  CPC ................. F25D 21/14; F24F 13/222
  (Continued)

(56) References Cited

U.S. PATENT DOCUMENTS 8,511,105 B2 * 8/2013 Kamen .................. B01D 1/28
                                                    62/285
2004/0040322 A1    3/2004 Engel et al.
(Continued)

FOREIGN PATENT DOCUMENTS

CN        1880864      6/2010
CN      201637001     11/2010
(Continued)

OTHER PUBLICATIONS

Espacenet English Abstract, Publication No. 10-2009-0087560, published Aug. 18, 2009.
(Continued)

*Primary Examiner* — Melvin Jones
(74) *Attorney, Agent, or Firm* — Staas & Halsey LLP

(57) ABSTRACT

An appliance for dehumidification, with a body having an inflow unit and an outflow unit; a heat-exchanging apparatus to condense vapor in the air; a fan to forcedly move the air; a tray to collect condensation water descending from a cooling apparatus; a water container detachably provided at an upper portion of the body to store the condensation water; a pump to pump the condensation water from the tray to the water container; and a drain pipe to guide the condensation water from the pump to the water container. The water container may be easily separated from the appliance to empty the water container when the water container is full, and then the water container may be easily mounted again.

42 Claims, 47 Drawing Sheets

(51) Int. Cl.
*B01D 53/26* (2006.01)
*B01D 53/04* (2006.01)
*F24F 6/00* (2006.01)

(52) U.S. Cl.
CPC ........ *B01D 53/265* (2013.01); *B01D 2257/80* (2013.01); *F24F 2006/008* (2013.01)

(58) Field of Classification Search
USPC .................................. 62/189, 285, 291, 509
See application file for complete search history.

(56) References Cited

U.S. PATENT DOCUMENTS

| | | |
|---|---|---|
| 2010/0000242 A1 | 1/2010 | Chiu |
| 2012/0137641 A1 | 6/2012 | Thrush et al. |

FOREIGN PATENT DOCUMENTS

| | | |
|---|---|---|
| JP | 6-14830 | 2/1994 |
| JP | 2001-221470 | 8/2001 |
| JP | 2004-181279 | 7/2004 |
| JP | 2004-278952 | 10/2004 |
| JP | 2005-42947 | 2/2005 |
| KR | 10-2006-0129672 | 12/2006 |
| KR | 10-2009-0087560 | 8/2009 |
| KR | 10-1327364 | 11/2013 |

OTHER PUBLICATIONS

Espacenet English Abstract, Publication No. 10-1327364, published Nov. 11, 2013.
English Abstract, Publication No. 6-14830, published Feb. 25, 1994.
Espacenet English Abstract, Publication No. 2004-181279, published Jul. 2, 2004.
Espacenet English Abstract, Publication No. 2001-221470, published Aug. 17, 2001.
International Search Report dated Mar. 29, 2016 in corresponding International Patent Application No. PCT/KR2015/012169.
Espacenet Abstract, Publication No. 2004-278952, Published Oct. 7, 2004.
Espacenet Abstract, Publication No. 2005-042947, Published Feb. 17, 2005.
KIPRIS Abstract, Publication No. 10-2006-0129672, Published Dec. 18, 2006.
Espacenet English Abstract for Chinese Patent Application Publication No. 1880864, published Jun. 9, 2010.
Espacenet English Abstract for Chinese Patent Application Publication No. 201637001, published Nov. 17, 2010.
Extended European Search Report for European Patent Application No. 15858696.6, dated Aug. 3, 2017.
Australian Office Action dated Dec. 14, 2017, in corresponding Australian Patent Application No. 1081029.
Australian Office Action dated Apr. 13, 2018, in corresponding Australian Patent Application No. 2015347440.
Extended European Search Report dated Apr. 19, 2018, in corresponding European Patent Application No. 17205322.5.

* cited by examiner

APPLIANCE FOR DEHUMIDIFICATION AND MULTI-FUNCTION APPLIANCE FOR DEHUMIDIFICATON OR HUMIDIFICATION

CROSS-REFERENCE TO RELATED APPLICATIONS

This application claims the benefits of the Korean Patent Application No. 10-2014-0157310, filed on Nov. 12, 2014 and the Korean Patent Application No. 10-2015-0098908 filed on Jul. 13, 2015, in the Korean Intellectual Property Office, the disclosures of which are incorporated herein by reference.

BACKGROUND

1. Field

Embodiments of the present disclosure relate to an appliance for dehumidification and an appliance for dehumidification or humidification configured to control humidity.

2. Description of the Related Art

In general, an appliance for dehumidification is an apparatus configured to remove moisture in air. The appliance for dehumidification may largely be divided into a drying-type appliance for dehumidification and a cooling-type appliance for dehumidification. The drying-type appliance for dehumidification is provided with a method to perform a dehumidification by absorbing or adsorbing moisture in air by use of moisture an absorbent material, which is chemical substance, and the cooling-type appliance for dehumidification is provided with a method to condense vapor in air by cooling the temperature of the air below the dew point by use of a cooling cycle apparatus.

In the cooling-type appliance for dehumidification, when the temperature of the air surrounding a cooling apparatus of the cooling-type appliance for dehumidification falls below the dew point, condensation water is generated at the cooling apparatus, and a water container configured to store the condensation water descending from the cooling apparatus is provided under the cooling apparatus.

The water container is detachably provided at a lower portion of the appliance for dehumidification, and when the water container is full and needs to be emptied, difficulties may be present as a user may need to bend over or kneel down to use both hands to remove the water container. Difficulties may be present again due to the same reason as the above when mounting the water container again after emptying the water container.

With respect to a multi-function appliance for dehumidification or humidification, in general, a condensation water container configured to store condensation water generated during a dehumidification mode and a humidification water container configured to store humidification water supplied to a humidification device are separately provided, and thus the size of the multi-function appliance for dehumidification or humidification is needlessly increased.

SUMMARY

Therefore, it is an aspect of the present disclosure to provide an appliance for dehumidification having a structure capable of easily emptying a water container configured to store condensation water generated at a cooling apparatus when the water container is full and capable of remounting the water container.

It is another aspect of the present disclosure to provide an appliance for dehumidification or humidification provided with a combined water container having integrally combined a condensation water container and a humidification water container.

It is still another aspect of the present disclosure to provide an appliance for dehumidification capable of having a water container easily mounted and separated.

It is another aspect of the present disclosure to provide an appliance for dehumidification that can be easily drained of water of a water container.

Additional aspects of the disclosure will be set forth in part in the description which follows and, in part, will be obvious from the description, or may be learned by practice of the disclosure.

In accordance with one aspect of the present disclosure, an appliance for dehumidification may include a body having an inflow unit and an outflow unit; a draft fan to forcedly move air; a heat-exchanging apparatus to generate condensation water by condensing vapor; a water collecting tray to collect the condensation water generated at the heat-exchanging apparatus; a water container detachably provided at an upper portion of the body as to drain the condensation water; a pump to pump the condensation water of the water collecting tray to the water container; and a drain pipe to guide the condensation water pumped by use of the pump to the water container.

The heat-exchanging apparatus may include a cooling apparatus to cool surrounding air by evaporating refrigerant.

The appliance for dehumidification may further include an adsorbent material to adsorb vapor, and a heater to generate heated wind to vaporize the water adsorbed at the adsorbent material.

The water container may be provided to be positioned higher than or at least at an identical level with respect to the heat-exchanging apparatus.

The appliance for dehumidification may include a water container mounting unit provided at an upper portion of the body as to mount the water container.

The appliance for dehumidification may include a drainage connecting port provided at the water container mounting unit such that the drainage connecting port is connected to the water container at the time of when the water container is mounted at the water container mounting unit, and such that the drainage connecting port is separated at the time of when the water container is released from the water container mounting unit.

The drainage connecting port may be moved backward in an opposite direction with respect to the water container after being pressed by the water container while being mounted at or released from the water container mounting unit, and that the drainage connecting port is protruded toward the water container at the time of when the water container is completely mounted at or released from the water container mounting unit.

The appliance for dehumidification may include an elastic member configured to elastically bias the drainage connecting port to be protruded toward the water container.

The drainage connecting port may include a contact surface that narrows outwardly to be pressed by the water container.

The drainage connecting port may include a stopper unit to limit a maximum protrusion distance.

The drainage connecting port may be provided at a side of a side wall unit of the water container, and an inlet unit through which the condensation water supplied through the drainage connecting port is inlet into an inside space of the water container may be formed at the side wall unit of the water container.

The drain pipe may include an outside extension pipe extended straightforwardly toward an upper direction of the water container after being extended from an outer side of a side of the water container in an upper side direction.

The outside extension pipe may include a reverse U-shaped pipe.

The drain pipe may include a coupling pipe having a drainage pipe coupling unit to which the reverse U-shaped pipe is coupled.

The appliance for dehumidification may include a consecutive drain pipe coupled to a drainage coupling unit of the coupling pipe while replacing the reverse U-shaped pipe, and configured to consecutively drain the condensation water to an outside of the water container.

One end portion of a side of the water container of the outside extension pipe may be positioned at a side of an upper wall unit of the water container, and an inlet unit through which the condensation water supplied through the outside extension pipe is inlet to an inside space of the water container may be formed at the upper wall unit of the water container.

The drainage pipe may include an inside extension pipe protruded from the water container mounting unit to an upper side and penetrated through a bottom unit of the water container as to guide condensation water to an inside space of the water container.

An inlet unit though which the inside extension pipe is penetrated may be formed at the bottom unit of the water container.

The bottom unit of the water container may include a bulge unit bulged toward an upper side, and the inlet unit may be formed at the bulge unit.

The appliance for dehumidification may include a sealing member to seal between the inlet unit and the inside extension pipe.

The water container mounting unit may include a mounting space at which the water container is mounted, and a lower supporting unit to support the bottom unit of the water container.

The water container mounting unit may include a side wall supporting unit to support the side wall unit of the water container.

The water container may include a noise preventing rib configured to prevent condensation water from directly descending toward the bottom unit of the water container by having the condensation water being inlet through the inlet unit flow along the noise preventing rib.

In accordance with another aspect of the present disclosure, an appliance for dehumidification or humidification may include a body; a draft fan to forcedly move air; a heat-exchanging apparatus to condense vapor included in the air; a humidification device configured to perform a humidification of the air by vaporizing humidification water after being supplied with the humidification water; and a combined water container configured to store the condensation water generated from the heat-exchanging apparatus during a dehumidification mode and to store the humidification water to be supplied to the humidification device during a humidification mode, and detachably provided at an upper portion of the body.

The combined water container may be positioned at a higher position than the humidification device such that the humidification water of the combined water container may be supplied to the humidification device by use of the weight of the humidification water.

The appliance for dehumidification or humidification may include a humidification water supplying path, as a humidification water supplying path configured to guide the humidification water of the combined water container to the humidification device, configured to close during the dehumidification mode and to open during the humidification mode.

The combined water container may be mounted at the combined water container mounting unit of the body in a plurality of directions, and when the combined water container is mounted toward a first direction of the plurality of directions, the humidification water supplying path may be closed, and when the combined water container is mounted toward a second direction of the plurality of directions, the humidification water supplying path may be open.

The combined water container may include a humidification water outflow unit forming at least a portion of the humidification water supplying path; a opening/closing member movably provided to open/close the humidification water outflow unit; and an elastic member to elastically bias the opening/closing member toward a direction to close the humidification water outflow unit.

The appliance for dehumidification or humidification may include a bump provided at the combined water container mounting unit of the body to press the opening/closing member toward a direction in which the humidification water outflow unit is open.

The appliance for dehumidification or humidification may include an automatic or a manual opening/closing valve provided at the humidification water supplying path as to open/close the humidification water supplying path.

The humidification device may include a certain one of a humidifying filter to absorb humidification water, a heater to heat humidification water, and an ultrasonic vibrator to vibrate humidification water.

In accordance with still another aspect of the present disclosure, an appliance for humidification may include a body; a heat-exchanging apparatus to generate condensation water by condensing vapor; and a water container detachably mounted at an upper portion of the body and having a hollow hole, and the body may include a guide unit inserted into the hollow hole as to mount and separate the water container.

The water container may be provided with an inner side wall surrounding the hollow hole.

The guide unit of the body is capable of supporting the inner side wall of the water container.

The water container may be provided with an outer side wall provided at an outer side of the inner side wall as to form an inside space in between the outer side wall and the inner side wall in which water may be stored.

The water container may be provided in the shape of a ring.

A guide path to guide air may be formed at an inside of the guide unit.

An outflow unit through which air outflows may be formed at an upper surface of the guide unit.

A display unit may be provided at an upper surface of the guide unit.

A control unit may be provided at an upper surface of the guide unit.

The water container may include a body of the water container, and a handle rotatively coupled to an upper portion of the body of the water container.

The water container may include a body of the water container, and a side handle recessively formed at a side surface of the body of the water container.

In accordance with an aspect of the present disclosure, as a water container configured to store condensation water generated from a cooling apparatus is detachably provided at an upper portion of an appliance for humidification, a user may easily separate or mount the water container from a body of the appliance for humidification when the water container needs to be emptied, i.e., when the water container is full, or when the emptied water container needs to be re-mounted.

In accordance with an aspect of the present disclosure, an appliance for dehumidification or humidification is provided with a combined water container provided with a condensation water container and a humidification water container integrally combined, and thus the size of the appliance for dehumidification or humidification may be reduced.

In accordance with an aspect of the present disclosure, a water container is formed in the shape of a ring having a hollow hole, and as a guide unit inserted into the hollow hole of the water container is provided, the mounting and separating of the water container is easily performed, and as an unintended separation of the water container during a course of moving the body is prevented, user convenience and reliability may be enhanced.

In accordance with an aspect of the present disclosure, a water container is provided with a upper handle rotatively mounted at an upper portion of the water container, and a pair of side handles recessively and integrally formed at a side surface of the water container, so that a user may be able to mount, separate, and empty the water container while holding the water container by freely selecting one of the upper handle or the side handles.

In accordance with an aspect of the present disclosure, as a guide path to guide air to an inside of a guide unit of a body is formed and a display unit and a control unit are provided at an upper surface of the guide unit, space utilization and user convenience may be increased.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
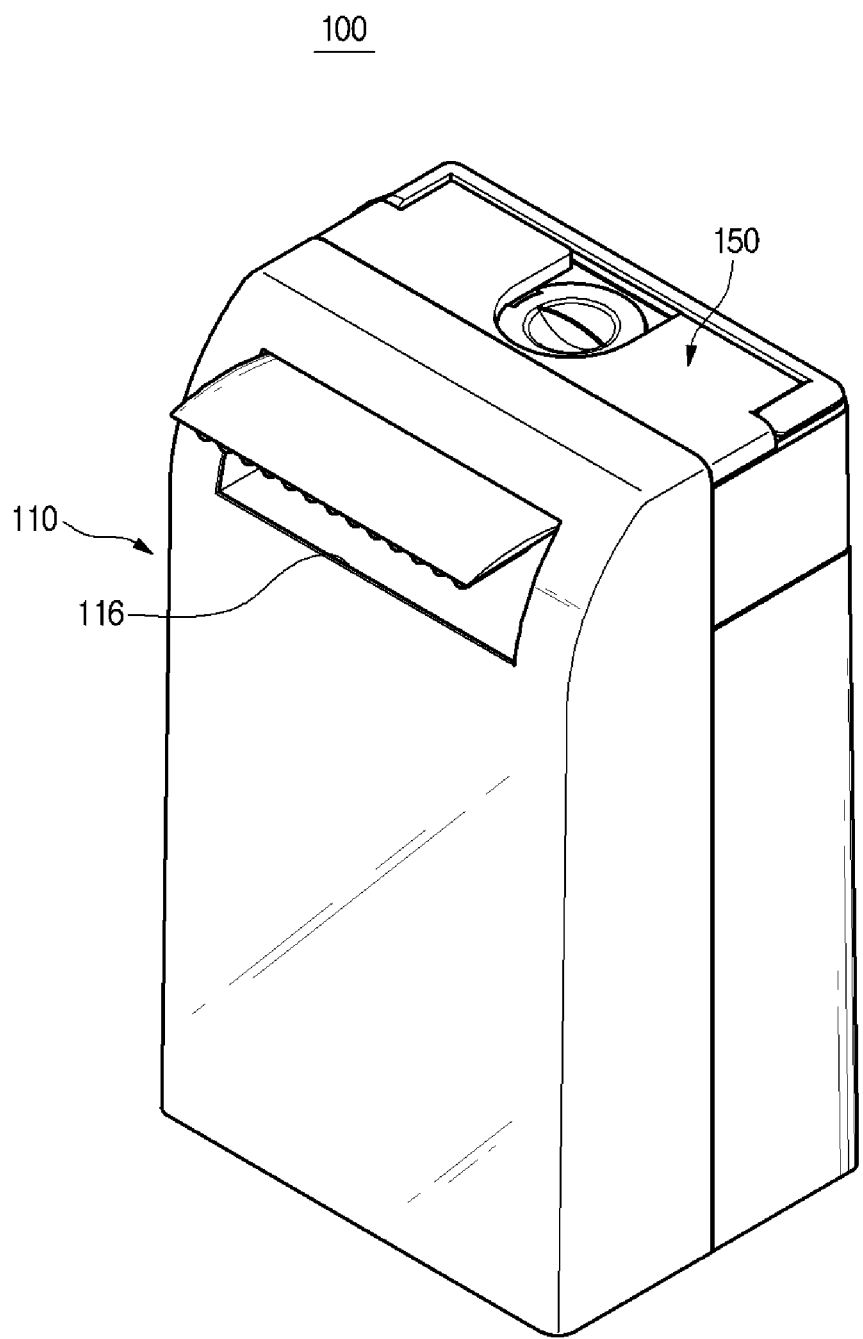
FIG. 1 is a perspective view illustrating an external appearance of an appliance for dehumidification according to a first embodiment of the present disclosure.

Reference will now be made in detail to the embodiments of the present disclosure, examples of which are illustrated in the accompanying drawings, wherein like reference numerals refer to like elements throughout.

Figure 2:
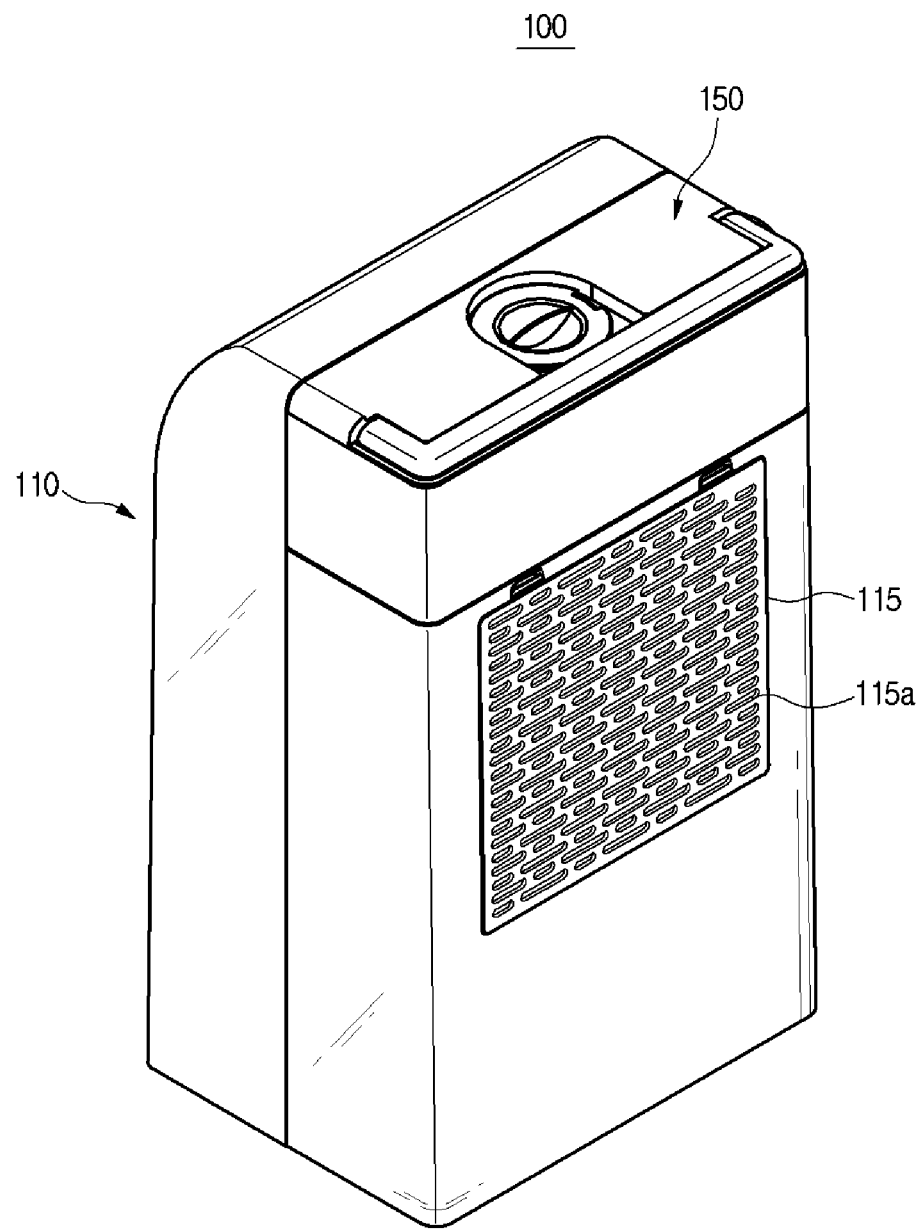
FIG. 2 is a perspective view from a different angle illustrating the external appearance of the appliance for dehumidification of FIG. 1.
Figure 3:
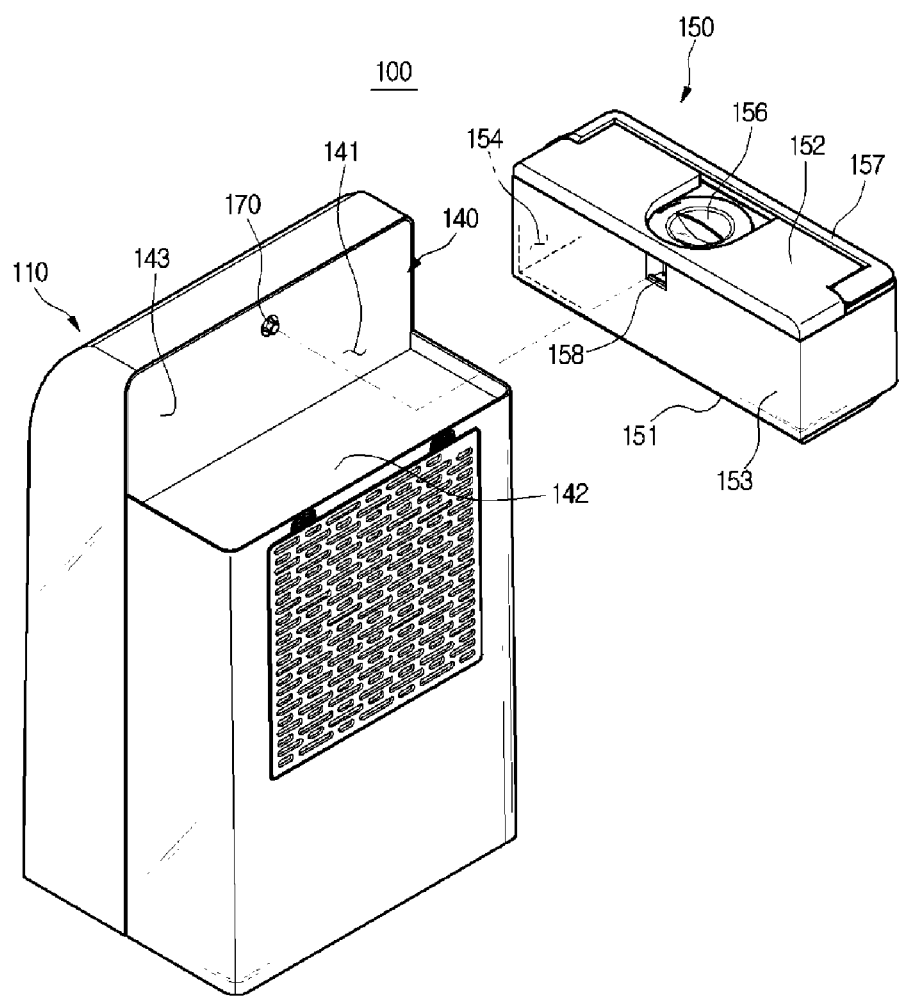
FIG. 3 illustrates a water container separated from the appliance for dehumidification of FIG. 1.
Figure 4:
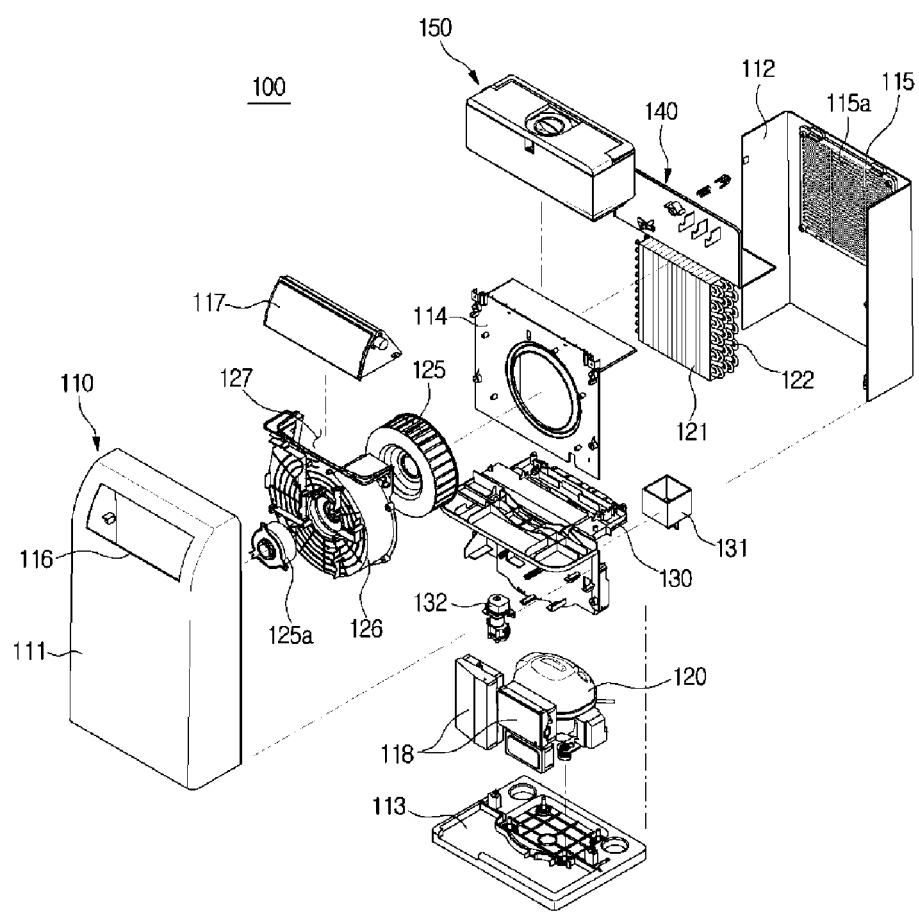
FIG. 4 is an exploded perspective view illustrating disassembled main structures of the appliance for dehumidification of FIG. 1.
Figure 5:
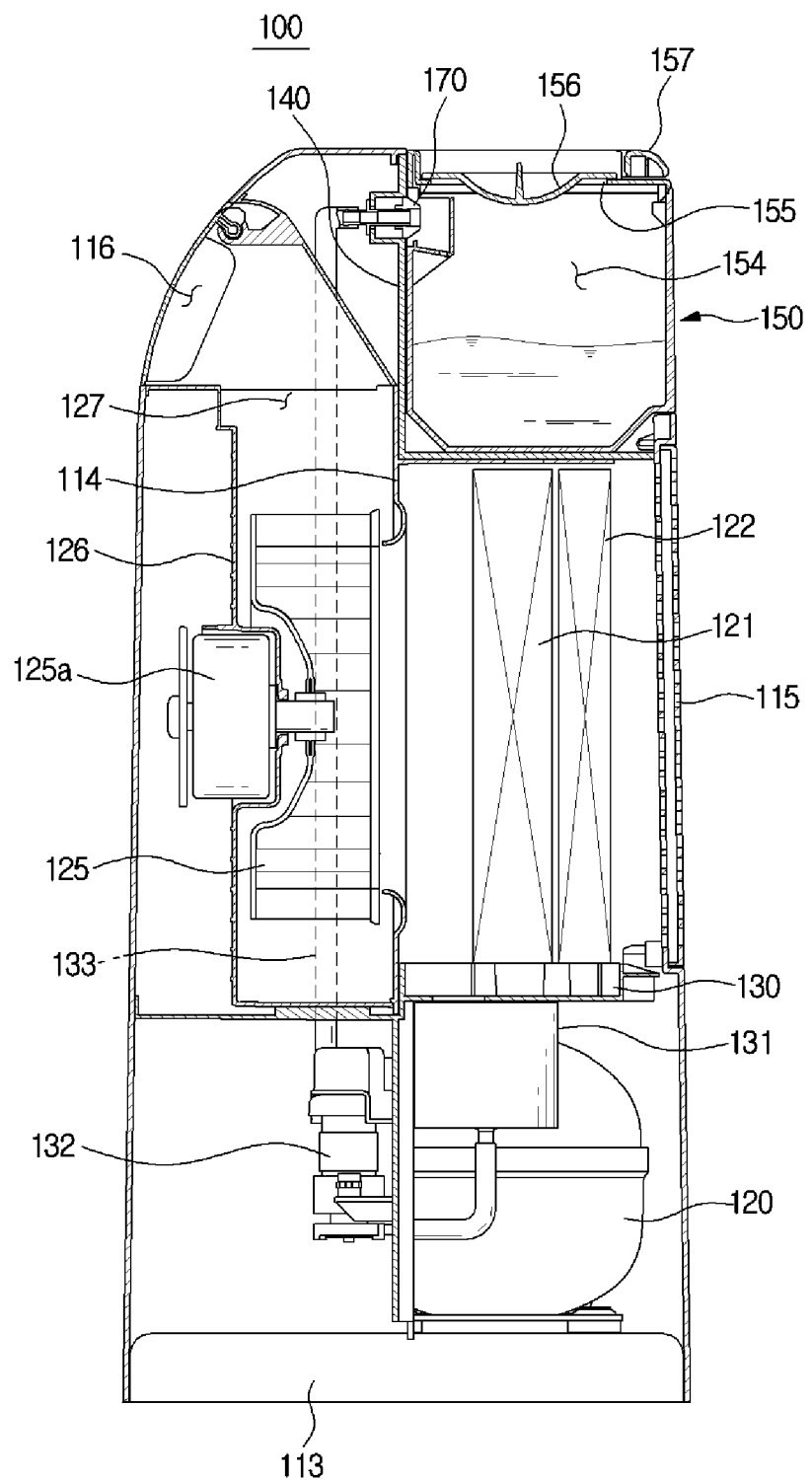
FIG. 5 is a side cross-sectional view of the appliance for dehumidification of FIG. 1.
Figure 6:
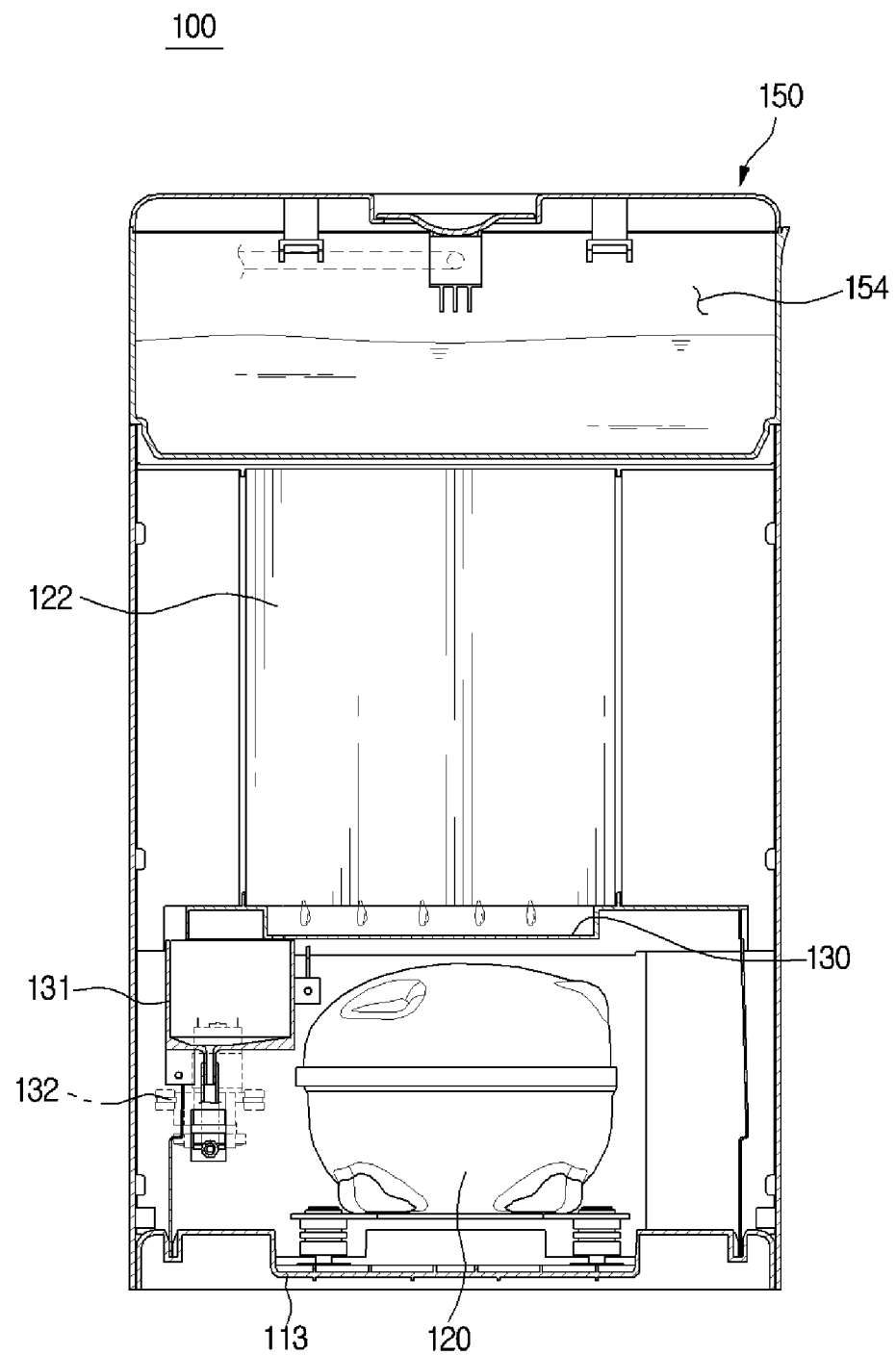
FIG. 6 is a frontal view of the appliance for dehumidification of FIG. 1.

FIG. 1 is a perspective view illustrating an external appearance of an appliance for dehumidification according to a first embodiment of the present disclosure, FIG. 2 is a perspective view from a different angle illustrating the external appearance of the appliance for dehumidification of FIG. 1, FIG. 3 illustrates a water container separated from the appliance for dehumidification of FIG. 1, FIG. 4 is an exploded perspective view illustrating disassembled main structures of the appliance for dehumidification of FIG. 1, FIG. 5 is a side cross-sectional view of the appliance for dehumidification of FIG. 1, and FIG. 6 is a frontal view of the appliance for dehumidification of FIG. 1.

Referring to FIG. 1 to FIG. 6, an appliance for dehumidification 100 includes a body 110 having an inflow unit 115 and an outflow unit 116, a draft fan 125 to forcedly move air, a cooling cycle apparatus having a compressor 120 to compress refrigerant, a condenser 121, or a heat-exchanging apparatus, to condense the refrigerant and emit latent heat to an outside, an expansion valve (not shown) to expand the refrigerant, and an evaporator 122, or cooling apparatus or a heat-exchanging apparatus, to absorb latent heat of an outside by evaporating the refrigerant and to condense the vapor of the surrounding air, a drain duct 130 to guide condensation water generated from the evaporator 122, a water collecting tray 131 to collect the condensation water that is guided by use of the drain duct 130, a water container 150 detachably provided at an upper portion of the body 110 as to drain the condensation water, a pump 132 to pump the condensation water collected at the water collecting tray 131 to the water container 150, and a drain pipe 133 to guide the condensation water pumped by the pump 132 to the water container 150 at the upper portion of the body 110.

Air that flows inwardly through the inflow unit 115 is cooled and dehumidified after passing through the evaporator 122, and is heated after passing through the condenser 121, and then the air that is dry may outflow through the outflow unit 116.

However, the appliance for dehumidification, other than the method of using the cooling cycle apparatus, may perform a dehumidification by use of the method using adsorbent material. When vapor is adsorbed at the adsorbent material, the adsorbed water is vaporized by use of a heater, and the vaporized water may be condensed through the heat-exchanging apparatus.

The body 110 may be structured with a front case 111, a rear case 112, a lower case 113, and a supporting frame 114 provided between the front case 111 and the rear case 112 to support various components. The inflow unit 115 may be formed at a rear of the body 110, and the outflow unit 116 may be formed at an upper side of a front of the body 110. The inflow unit 115 may be provided with a grill 115a to filter foreign substances, and a louver 117 to adjust the direction of outflow air or to open/close the outflow unit 116 may be provided.

The cooling cycle apparatus having the compressor 120, the condenser 121, the expansion valve, and the evaporator 122 is provided at an inside of the body 110. The compressor 120 may be disposed at a lower portion of the body 110, the evaporator 122 may adjacently be disposed at the inflow unit 115 at a rear, and the condenser 121 may be disposed at a front of the evaporator 122.

The draft fan 125 may be rotated by receiving rotational force from a driving motor 125a. The draft fan 125, after receiving air from a rear of the body 110, may forcedly move the air to flow toward the upper side of a front of the body 110 after the air is sequentially passed through the evaporator 122 and the condenser 121. An inside of the body 110 may be provided with an air current guiding unit 126 to guide the current of air. The draft fan 125 may be a centrifugal fan configured to outflow air in a radial direction after having the air inflow in an axial direction, and an air current exit unit 127 may be formed at the air current guiding unit 126 at a position corresponding to the outflow unit 116 of the body 110. Various electronic boxes 118 may be provided at a lower portion of the body 110.

This structure, as the air that inflows into an inside of the body 110 is cooled below the dew point at the evaporator 122, the vapor included in the air is condensed, and the air that is dried is heated after passing through the condenser 121 and the heated air may flow to an outside of the body 110 in a state of having a lower relative humidity.

The condensation water condensed at the evaporator 122 flows downward along the evaporator 122, and descends below the evaporator 122, and the drain duct 130 may be provided below the evaporator 122 as to guide the descended condensation water.

The drain duct 130 is provided to guide condensation water to the water collecting tray 131, and for the above, the drain duct 130 may be inclined toward the water collecting tray 131. The drain duct 130 is provided in a size capable of covering the entire area of the evaporator 122.

The water collecting tray 131 may store condensation water. In the embodiment of the present disclosure, the drain duct 130 and the water collecting tray 131 are separately formed, but the drain duct 130 and the water collecting tray 131 may be integrally formed.

A water level sensor (not shown) may be provided at the water collecting tray 131. When the water level of the water collecting tray 131 reaches full or at a certain level, the pump 132 is driven and the condensation water of the water collecting tray 131 may be pumped.

The pump 132 may be a centrifugal pump structured with a motor (not shown) to generate rotational force and rotational wings (not shown) to be rotated by receiving the rotational force from the motor (not shown). The condensation water pumped by the pump 132 may be guided by the drain pipe 133 to the water container 150 provided at the upper portion of the body 110.

A water container mounting unit 140 at which the water container 150 is mounted may be provided at an upper portion of the body 110. The water container mounting unit 140 may include a mounting space 141 at which the water container 150 is mounted, a bottom supporting unit 142 to support a bottom unit 151 of the water container 150, and a side wall supporting unit 143 to support a side wall unit 153 of the water container 150.

The water container mounting unit 140 may be provided with a guide unit (not shown) to guide the movement of the water container 150 at the time of mounting the water container 150. The water container mounting unit 140 may be provided with a fixing member (not shown) to fix the mounted water container 150. The water container 150 mounted at the water container mounting unit 140 may be disposed at a higher position than the evaporator 122 or at least at an identical level with respect to the evaporator 122.

As the above, as the water container 150 is provided at the upper portion of the appliance for dehumidification 100, a user may easily separate and empty the water container 150 when the water container 150 is full, and may also easily mount the water container 150 after emptying the water container 150.

The water container 150 in the embodiment of the present disclosure is provided with the approximate shape of a box. However, the shape thereof is not limited hereto, and the shape of the water container 150 is provided with no limit. The water container 150 may be provided with the bottom unit 151, the side wall unit 153 at each of the left, right, front, and rear sides, an upper wall unit 152, and an inside space 154. The upper wall unit 152 of the water container 150 is provided with a drain unit 155 through which the condensation water stored at the water container 150 may be emptied, and a drain cover 156 may be detachably coupled to the drain unit 155. The water container 150 may be provided with a handle 157 to easily transport the water container 150.

The water container 150 may be provided with a water level sensor (not shown) to measure the level of the condensation water stored at the inside space 154. When the condensation water is filled up to the full level at the inside space 154 of the water container 150, an alarm is displayed to an outside, and the pump 132 may be stopped.

A drainage connecting port 170 may be provided at the water container mounting unit 140 such that connecting the water container 150 and the drain pipe 133 may be easily performed at the time of mounting the water container 150, and separating the water container 150 and the drain pipe 133 may be easily performed at the time of separating the water container 150. The drainage connecting port 170 will be described below.

Figure 7:
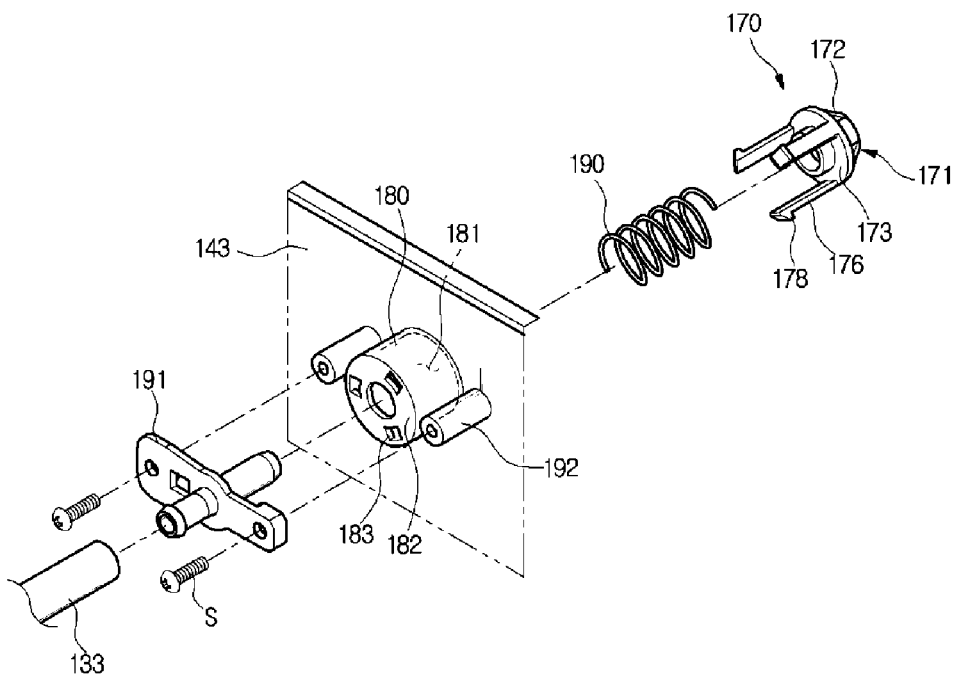
FIG. 7 illustrates a structure of a drainage connecting port of the appliance for dehumidification of FIG. 1.
Figure 8:
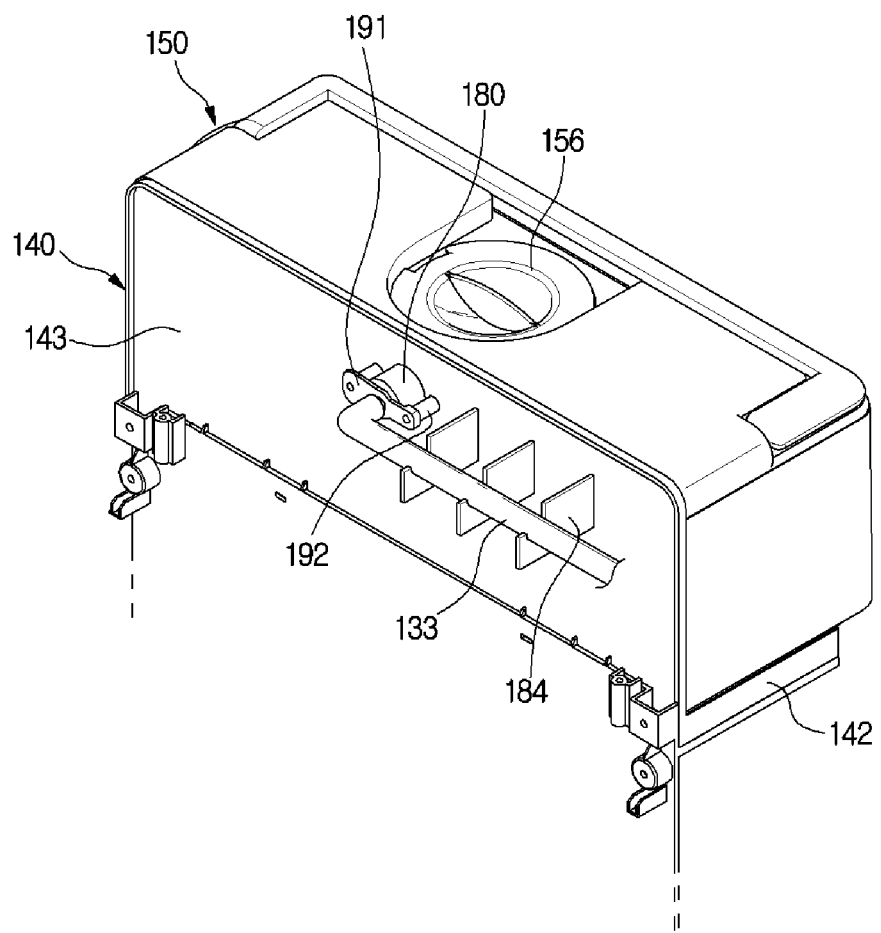
FIG. 8 illustrates a coupling structure of the drainage connecting port and a drain pipe of the appliance for dehumidification of FIG. 1.
Figure 9:
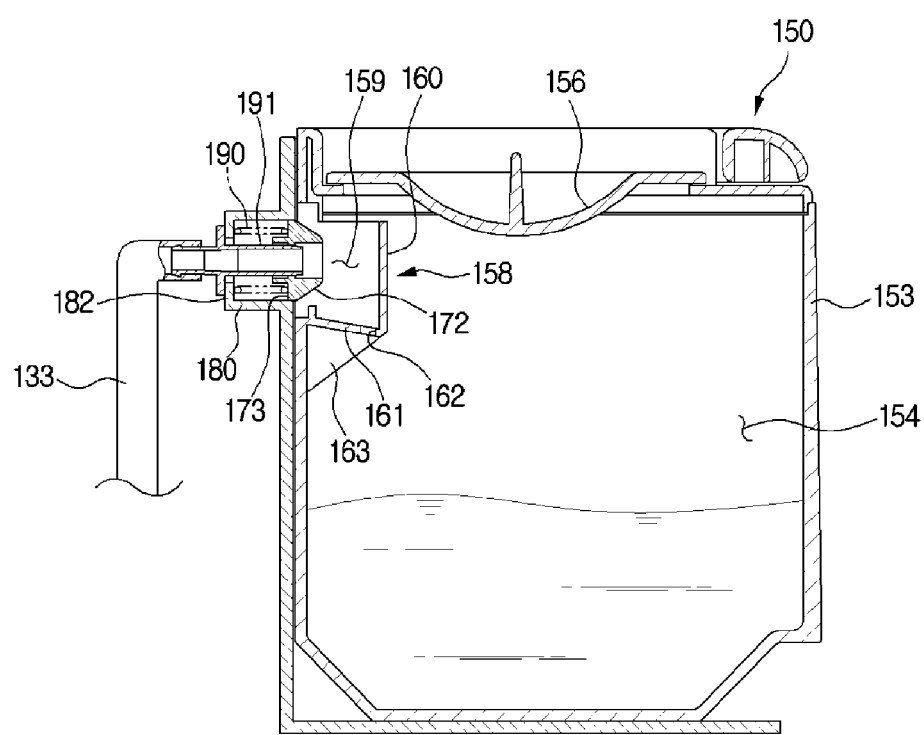
FIG. 9 is a cross-sectional view illustrating a coupling structure of the drainage connecting port and the water container of the appliance for dehumidification of FIG. 1.
Figure 10:
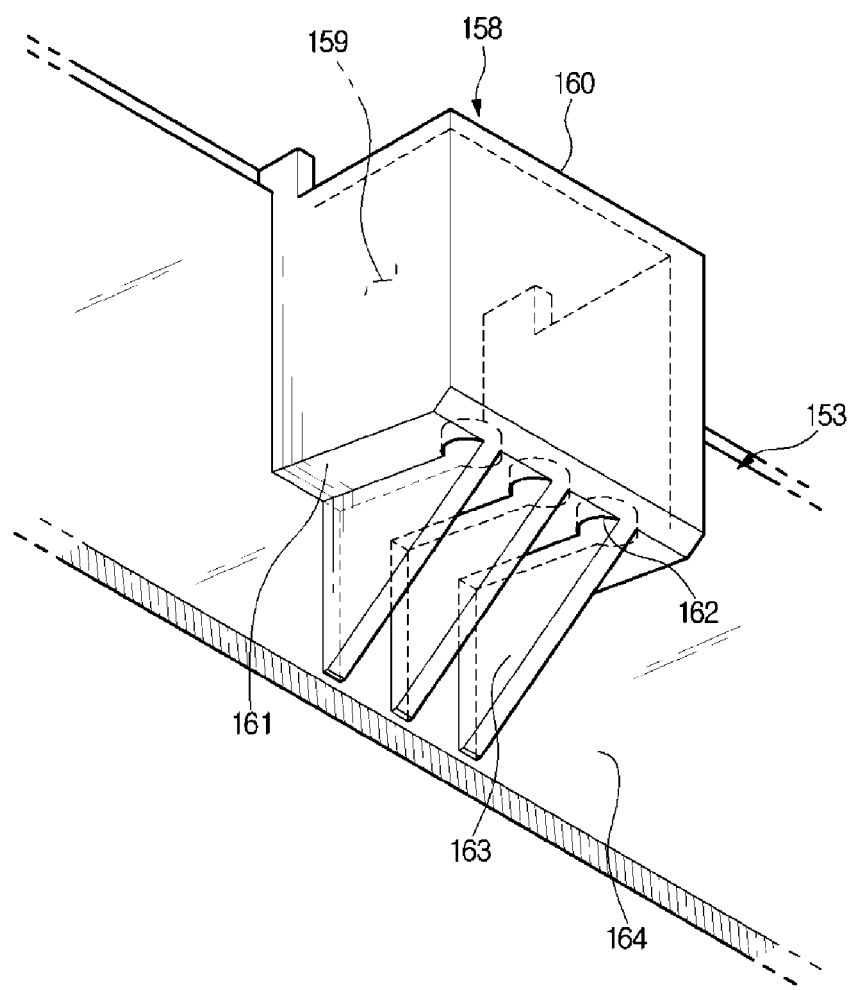
FIG. 10 illustrates a descending water noise preventing structure of the water container of the appliance for dehumidification of FIG. 1.

FIG. 7 illustrates a structure of the drainage connecting port of the appliance for dehumidification of FIG. 1, FIG. 8 illustrates a coupling structure of the drainage connecting port and the drain pipe of the appliance for dehumidification of FIG. 1, FIG. 9 is a cross-sectional view illustrating a coupling structure of the drainage connecting port and the water container of the appliance for dehumidification of FIG. 1, and FIG. 10 illustrates a descending water noise preventing structure of the water container of the appliance for dehumidification of FIG. 1.

Referring to FIG. 7 to FIG. 10, the drainage connecting port 170 may be provided at the side wall supporting unit 143 of the water container mounting unit 140. The side wall supporting unit 143 may be provided with a port supporting unit 180 formed thereto, and the port supporting unit 180 is configured to movably support the drainage connecting port 170. The port supporting unit 180 protrudes from the side wall supporting unit 143 to an opposite side of the water container 150, and a port accommodating space 181 at which the drainage connecting port 170 is accommodated may be formed at an inside. The drainage connecting port 170 may move at an inside of the port accommodating space 181.

The drainage connecting port 170 may include a body unit 171 that is pressed by the water container 150, and a leg unit 176 extended from the body unit 171. The body unit 171 may be provided with a contact surface 172 formed thereto, and the contact surface 172 that narrows towards an outer side and is pressed by the water container 150. The leg unit 176 is provided with a stopper unit 178 configured to limit a maximum protrusion distance of the drainage connecting port 170 formed thereto. The stopper unit 178 may be provided in larger size than the size of a hooking hollow 183 of the port supporting unit 180, and when the drainage connecting port 170 protrudes up to the maximum protrusion distance, the stopper unit 178 is hooked at the hooking hollow 183 and thus further protrusion may be limited.

The port accommodating space 181 may be provided with an elastic member 190 configured to elastically bias the drainage connecting port 170 to protrude toward the water container 150. One end of the elastic member 190 may be supported by use of an elastic member supporting unit 182 of the port supporting unit 180, while the other end of the elastic member 190 may be supported by an elastic member supporting unit 173 of the drainage connecting port 170.

Provided with the structure described above, the drainage connecting port 170 may be connected to the water container 150 when the water container 150 is mounted at the water container mounting unit 140, and may be separated from the water container 150 when the water container 150 is released from the water container mounting unit 140.

That is, the drainage connecting port 170 may be moved backward toward an opposite direction of the water container 150 by being pressed by the water container 150 while being mounted at or released from the water container mounting unit 140, and may be protruded toward the water container 150 at the time of when the mounting or the release of the water container 150 with respect to the water container mounting unit 140 is completed.

The drain pipe 133 may be coupled to a fixing pipe 191 after being guided by use of a guiding rib 184 provided at the side wall supporting unit 143. The fixing pipe 191 may be provided with one end portion of the water container 150 of the drain pipe 133 coupled thereto.

The side wall supporting unit 143 may be provided with a fixing pipe coupling unit 192 to which the fixing pipe 191 is coupled. The fixing pipe 191 may be coupled to the fixing pipe coupling unit 192 by use of a separate coupling member S such as a screw.

Provided with the structure described above, condensation water may be guided into the inside space 154 of the water container 150 after sequentially passing though the drain pipe 133, the fixing pipe 191, and the drainage connecting port 170.

The side wall unit 153 of the water container 150 may be provided with a port accommodating unit 158 accommodating the drainage connecting port 170. The port accommodating unit 158 may include an accommodation space 159 to accommodate the drainage connecting port 170, and an accommodation wall 160 recessively formed toward the water container 150 as to form the accommodation space 159.

The accommodation wall 160 at a lower portion 161 may be provided with an inlet unit 162, through which the condensation water delivered through the drainage connecting port 170 is introduced into the inside space 154 of the water container 150. A lower portion of the inlet unit 162 may be provided with a noise preventing rib 163 configured to prevent the condensation water moving through the inlet unit 162 from directly descending to the bottom unit 151 of the water container 150.

The condensation water moving through the inlet unit 162 may flow along the noise preventing rib 163, and thus the noise may be prevented from being generated. The noise preventing rib 163 may be inclined at the inlet unit 162 toward an outer side wall 164 of the water container 150.

Figure 11:
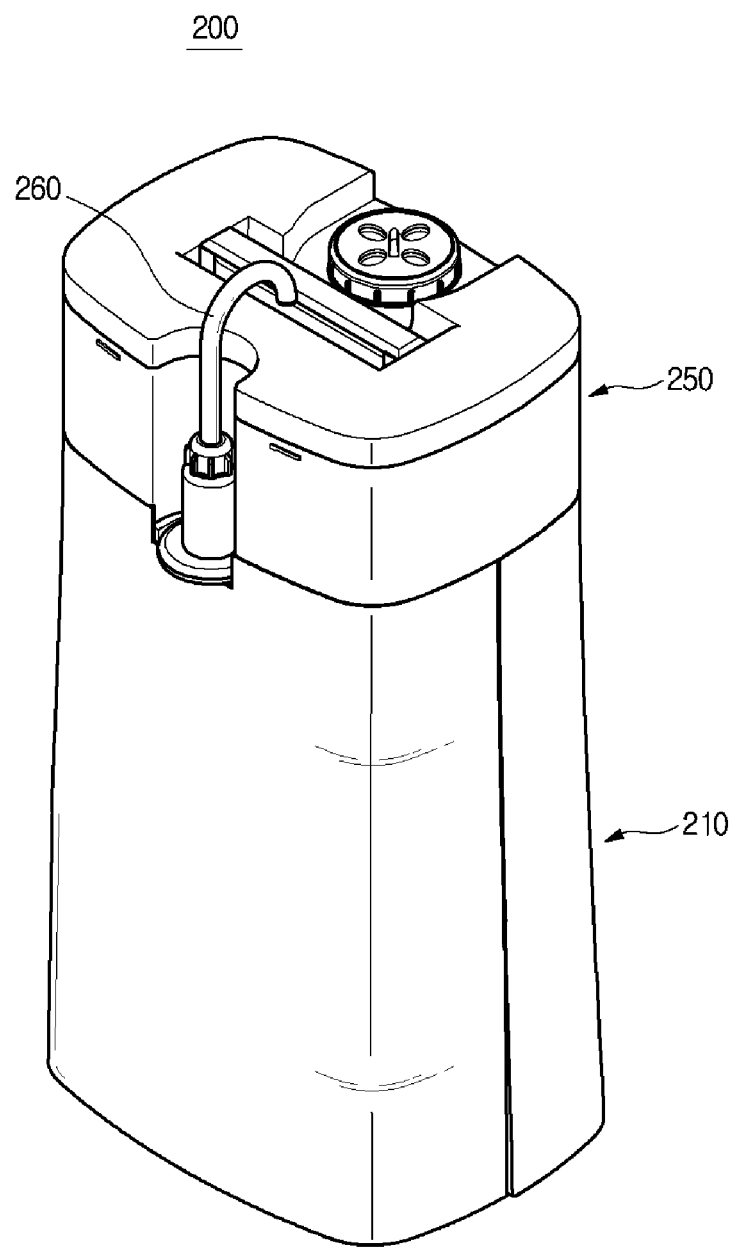
FIG. 11 is a perspective view of an external appearance of an appliance for dehumidification according to a second embodiment of the present disclosure.
Figure 12:
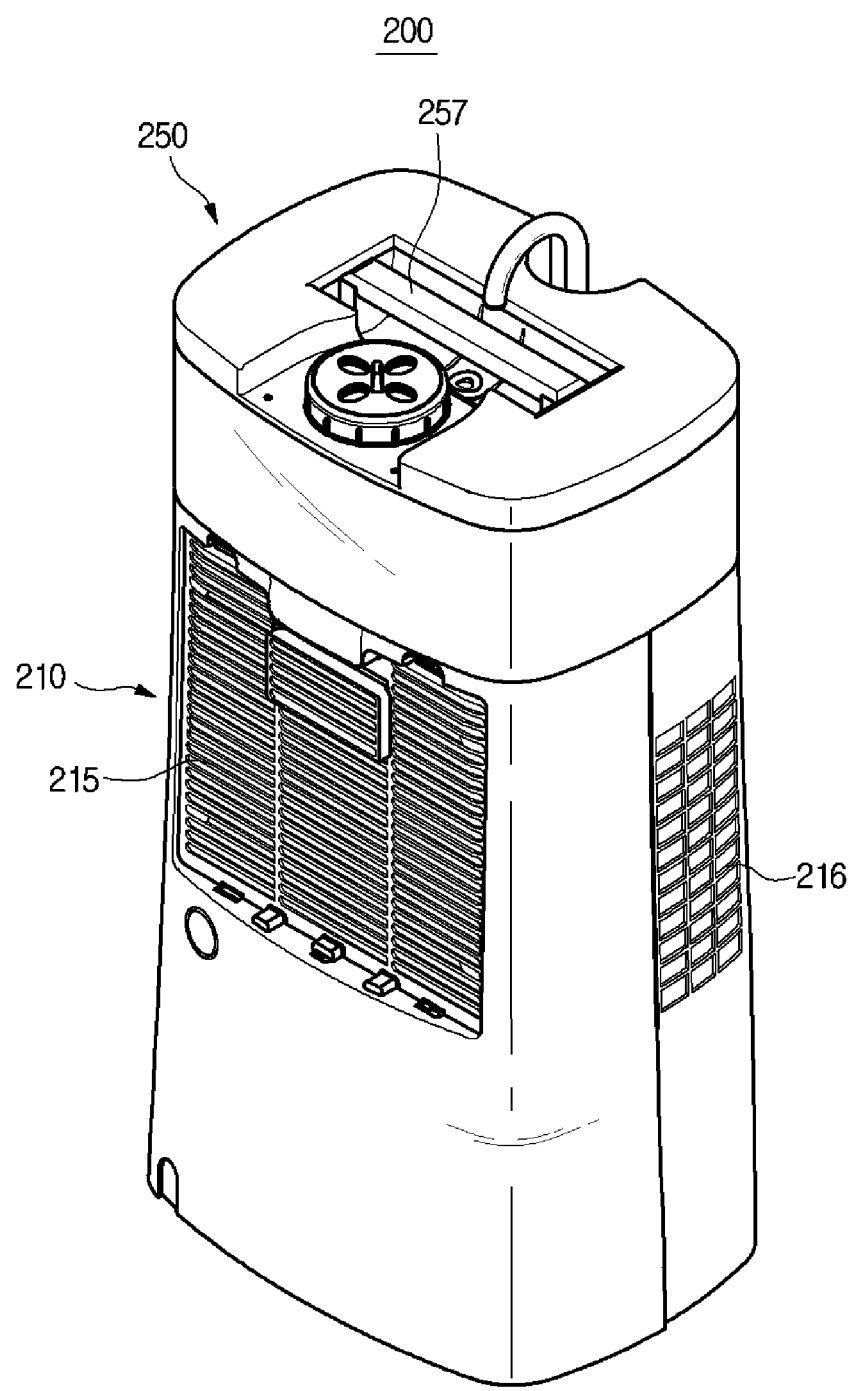
FIG. 12 is a perspective view from a different angle illustrating the external appearance of the appliance for dehumidification of FIG. 11.
Figure 13:
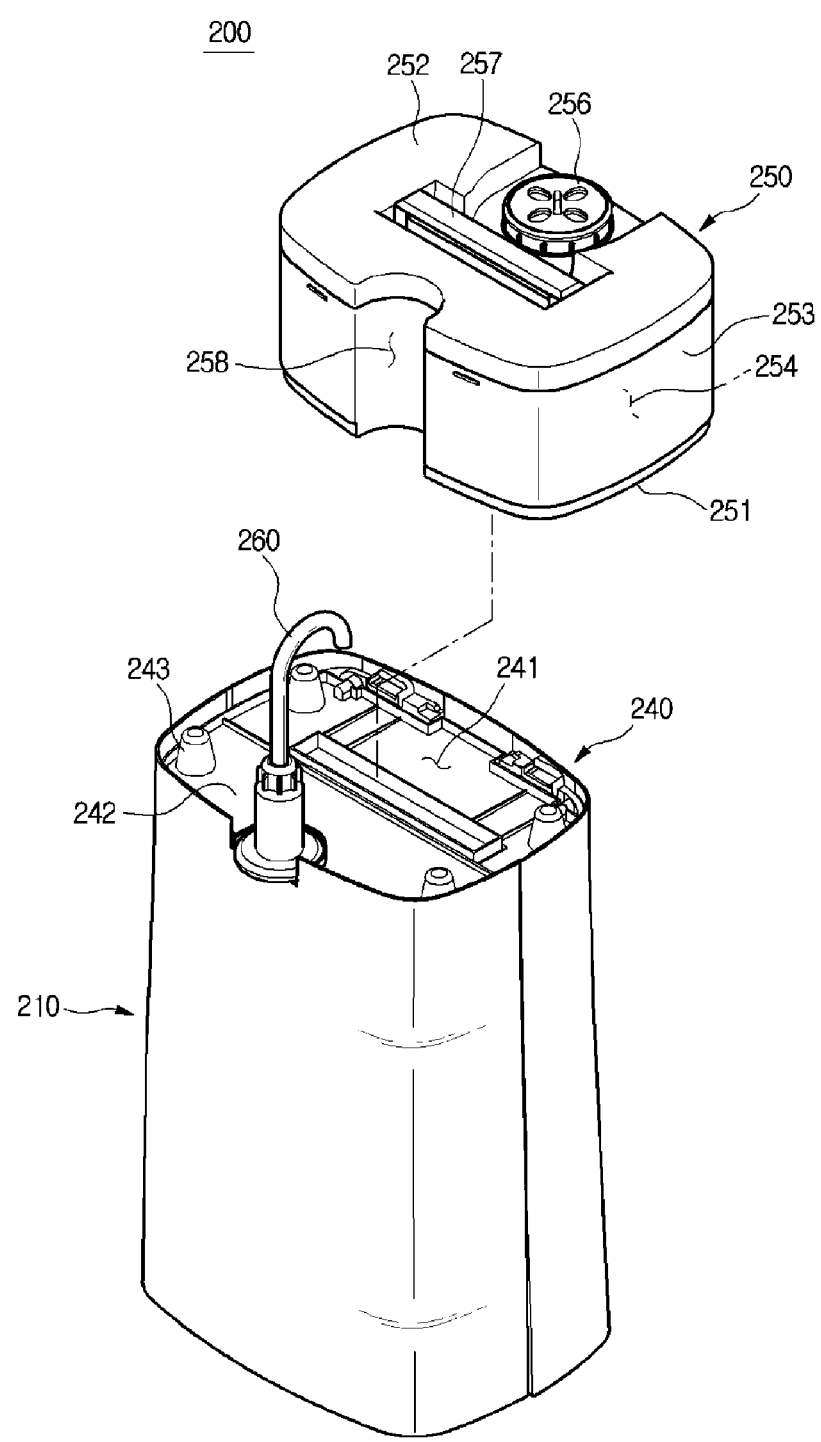
FIG. 13 illustrates a water container separated from the appliance for dehumidification of FIG. 11.
Figure 14:
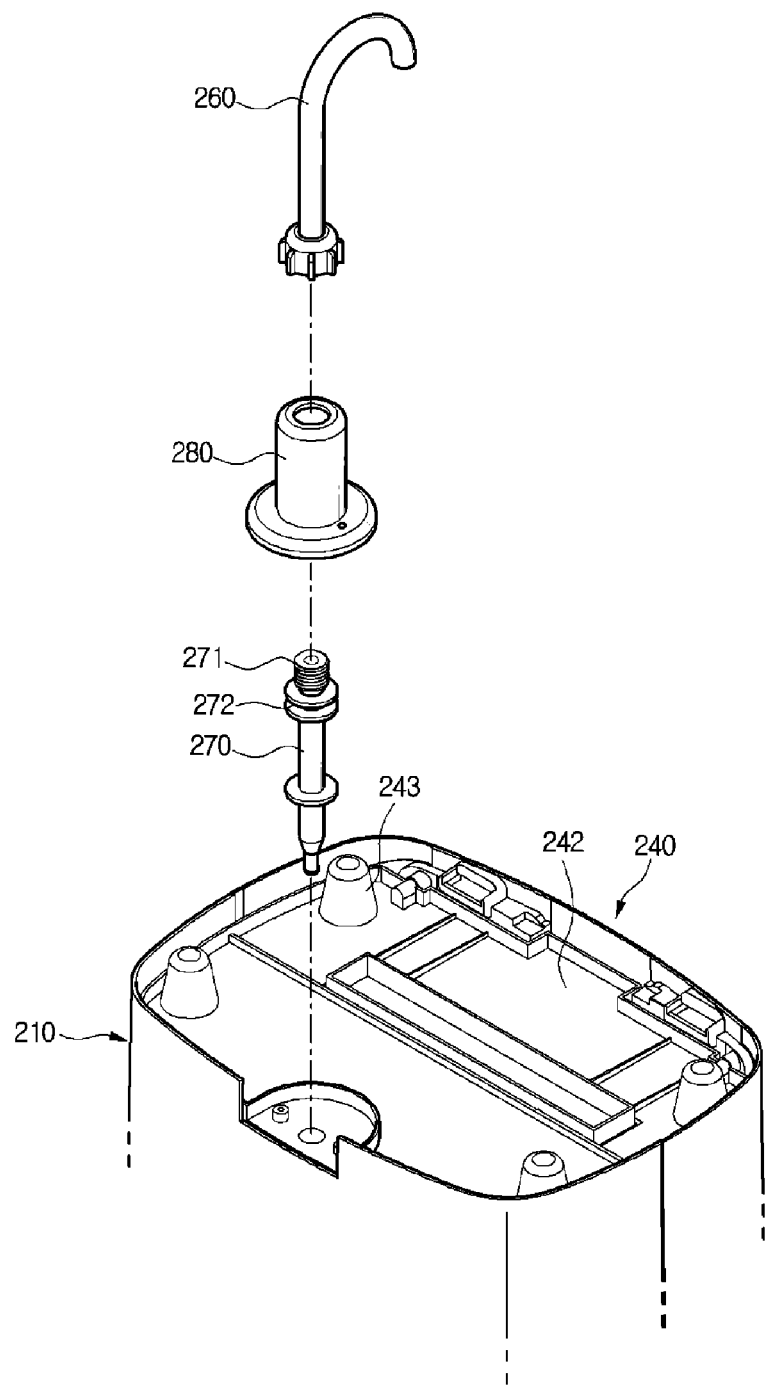
FIG. 14 illustrates a disassembled drain pipe of the appliance for dehumidification of FIG. 11.
Figure 15:
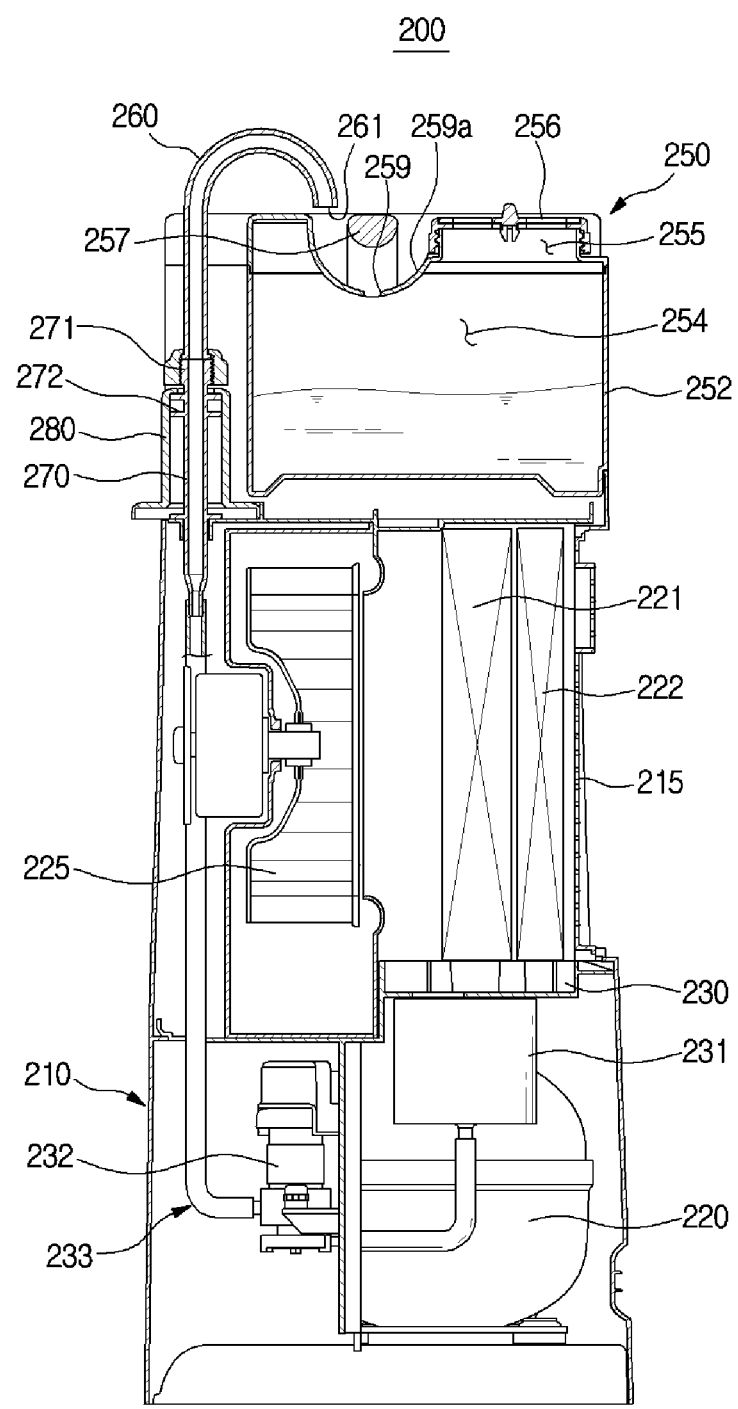
FIG. 15 is a side cross-sectional view of the appliance for dehumidification of FIG. 11.
Figure 16:
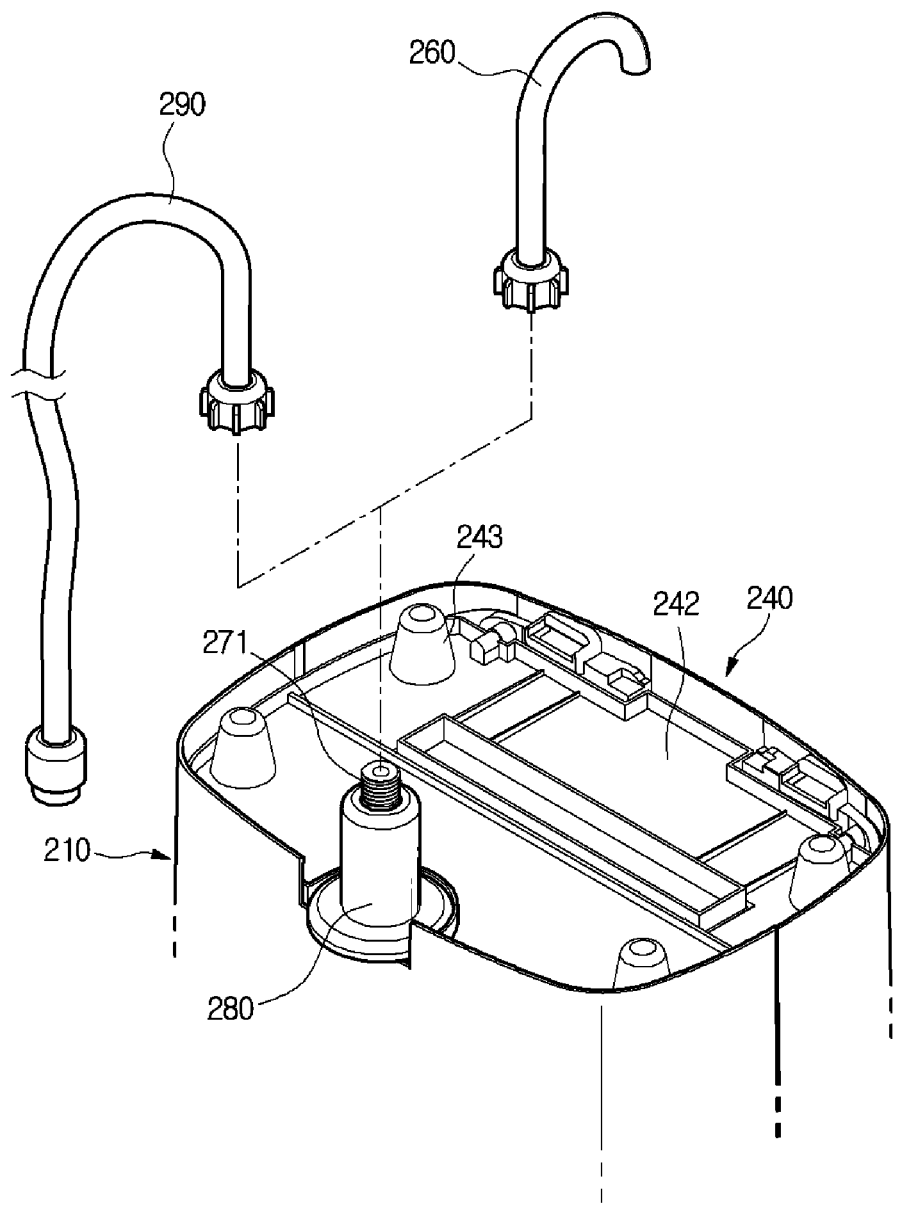
FIG. 16 is a side cross-sectional view illustrating a consecutive drain pipe of the appliance for dehumidification of FIG. 11.

FIG. 11 is a perspective view of an external appearance of an appliance for dehumidification according to a second embodiment of the present disclosure, FIG. 12 is a perspective view from a different angle illustrating the external appearance of the appliance for dehumidification of FIG. 11, FIG. 13 illustrates a water container separated from the appliance for dehumidification of FIG. 11, FIG. 14 illustrates a disassembled drain pipe of the appliance for dehumidification of FIG. 11, FIG. 15 is a side cross-sectional view of the appliance for dehumidification of FIG. 11, and FIG. 16 is a side cross-sectional view illustrating a consecutive drain pipe of the appliance for dehumidification of FIG. 11.

Referring to FIG. 11 to FIG. 16, the appliance for dehumidification according to the second embodiment of the present disclosure will be described.

An appliance for dehumidification 200 includes a body 210 having an inflow unit 215 and an outflow unit 216, a cooling cycle apparatus having a compressor 220 to compress refrigerant, a condenser 221 to condense the refrigerant and emit latent heat to an outside, an expansion valve (not shown) to expand the refrigerant, and an evaporator 222 to absorb latent heat of an outside and to condense the vapor of the surrounding air, a draft fan 225 configured to receive air from the inflow unit 215 and forcedly move the air through the outflow unit 216 after the inflow air is dehumidified through the evaporator 222 and then heated after passing through the condenser 221, a drain duct 230 to guide condensation water generated and descended from the evaporator 222, a water collecting tray 231 to collect the condensation water that is guided by the drain duct 230, a water container 250 detachably provided at an upper portion of the body 210 as to drain the condensation water, a pump 232 to pump the condensation water collected at the water collecting tray 231 to the water container 250, and a drain pipe 233 to guide the condensation water pumped by use of the pump 232 to the water container 250 at the upper portion of the body 210.

The inflow unit 215 of the appliance for dehumidification 200 may be formed at a rear of the body 210, and the outflow unit 216 may be formed at a side of the body 210.

A water container mounting unit 240 at which the water container 250 is mounted may be provided at an upper portion of the body 210. The water container mounting unit 240 may include a mounting space 241 at which the water container 250 is mounted, and a bottom supporting unit 242 to support a bottom unit 251 of the water container 250.

The water container mounting unit 240 may be provided with a guide bump 243 to guide the movement of the water container 250 at the time of mounting the water container 250, and a bump accommodation unit (not shown) configured to accommodate the guide bump 243 while corresponding to the guide bump 243 may be provided at the bottom unit 251 of the water container 250.

The water container mounting unit 240 may be provided with a fixing member (not shown) to fix the mounted water container 250. The water container 250 mounted at the water container mounting unit 240 may be disposed at a higher position than the evaporator 222 or at least at an identical level with respect to the evaporator 222.

The water container 250 may be provided with the bottom unit 251, a side wall unit 253, an upper wall unit 252, and an inside space 254. The upper wall unit 252 of the water container 250 is provided with a drain unit 255 through which the condensation water stored at the water container 250 may be emptied, and a drain cover 256 may be detachably coupled to the drain unit 255. The water container 250 may be provided with a handle 257 to easily transport the water container 250.

The upper wall unit 252 of the water container 250 may be provided with an inlet unit 259, through which condensation water is introduced into the inside space 254, formed thereto. The side wall unit 253 of the water container 250 may include a drain pipe accommodation unit 258 recessed toward an inner side such that an outside extension pipe 260 of the drain pipe 233 enters the drain pipe accommodation unit.

In the first embodiment of the present disclosure that is described above, the drainage connecting port 170 is used to easily connect the drain pipe and the water container. However, in the present embodiment of the present disclosure, while the drainage connecting port 170 is not being used, the structure of the drain pipe 233 is provided with an identical function as the drainage connecting port 170.

That is, the drain pipe 233 may include the outside extension pipe 260 extended straightforwardly toward an upper direction of the water container 250 after being extended from an outer side of a side of the water container 250 to an upper side direction. The outside extension pipe 260 may be a reverse U-shaped pipe having the approximate shape of a letter U.

One end portion 261 of the water container 250 of the outside extension pipe 260 may be provided at a higher position than the highest upper end of the water container 250, and the inlet unit 259 of the water container 250 may be formed at the upper wall unit 252 of the water container 250. Thus, the condensation water descending from the one end portion 261 of the outside extension pipe 260 may be inlet into the inlet unit 259 of the water container 250. In addition, the flow of the condensation water inlet into the inlet unit 259 after descending from the one end portion 261 of the outside extension pipe 260 may be realized. Furthermore, the flow of the condensation water may be further realized as the outside extension pipe 260 is provided with transparent material.

A bowl 259a may be formed around the inlet unit 259 such that the condensation water descending from the one end portion 261 of the outside extension pipe 260 to the upper wall unit 252 of the water container 250 may be guided to the inlet unit 259.

The water container 250 may be mounted at the water container mounting unit 240 after moving in a horizontal direction from a side of the water container mounting unit 240. The outside extension pipe 260 is provided not to interfere the water container 250 in the process of the water container 250 being mounted at the water container mounting unit 240.

The drain pipe 233 may include a coupling pipe 270 having a pipe coupling unit 271. The coupling pipe 270 may be supported while accommodated at a supporting pipe 280 being coupled to the body 210. For the above, the coupling pipe 270 may include a supporting flange 272 protruded toward an inner side surface of the supporting pipe 280. The appliance for dehumidification 200 may include a consecutive drain pipe 290 (FIG. 16) coupled to the pipe coupling unit 271 in place of the reverse U-shaped pipe 260 and configured to consecutively drain condensation water to an outside, not into the water container 250.

Figure 17:
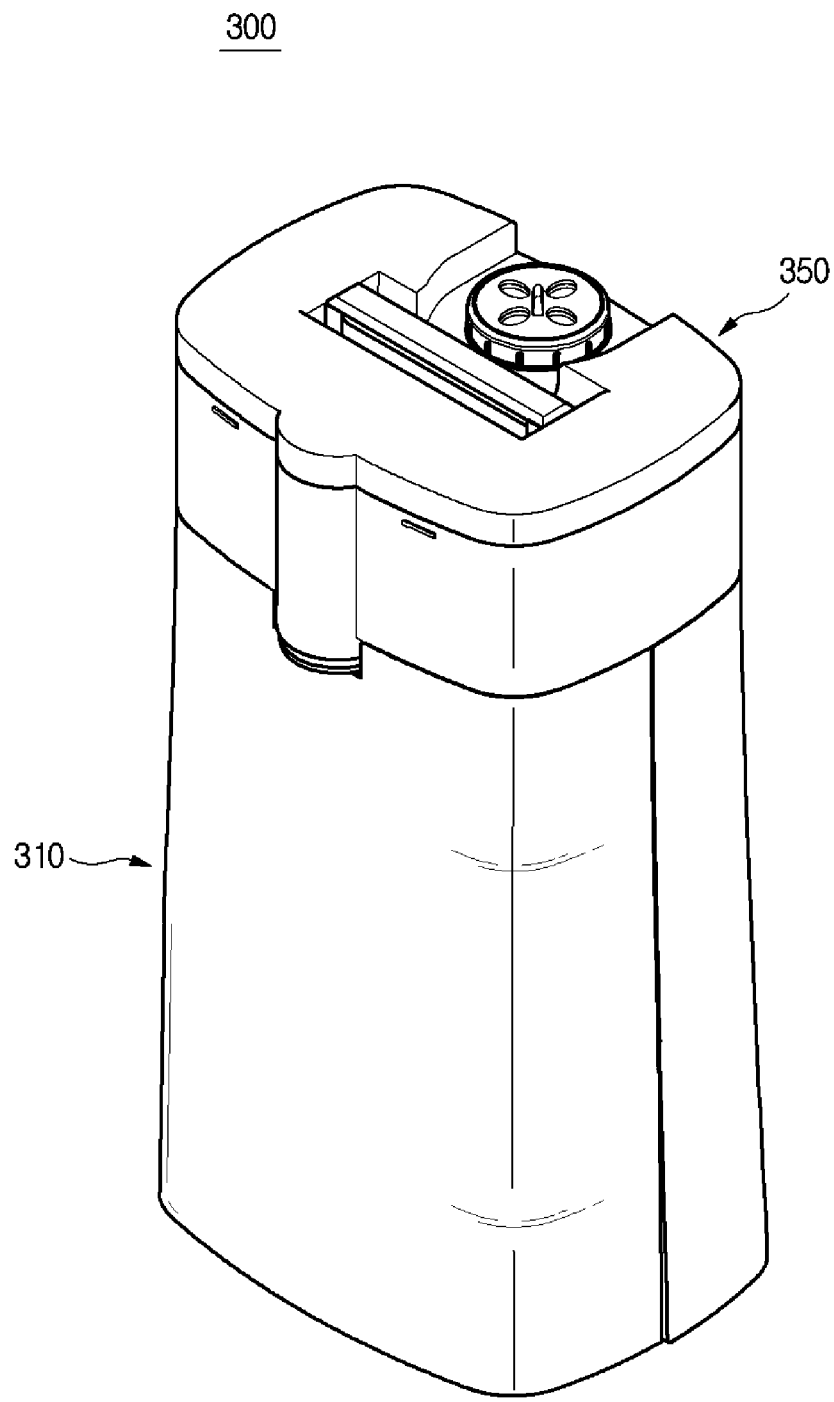
FIG. 17 is a perspective view of an external appearance of an appliance for dehumidification according to a third embodiment of the present disclosure.
Figure 18:
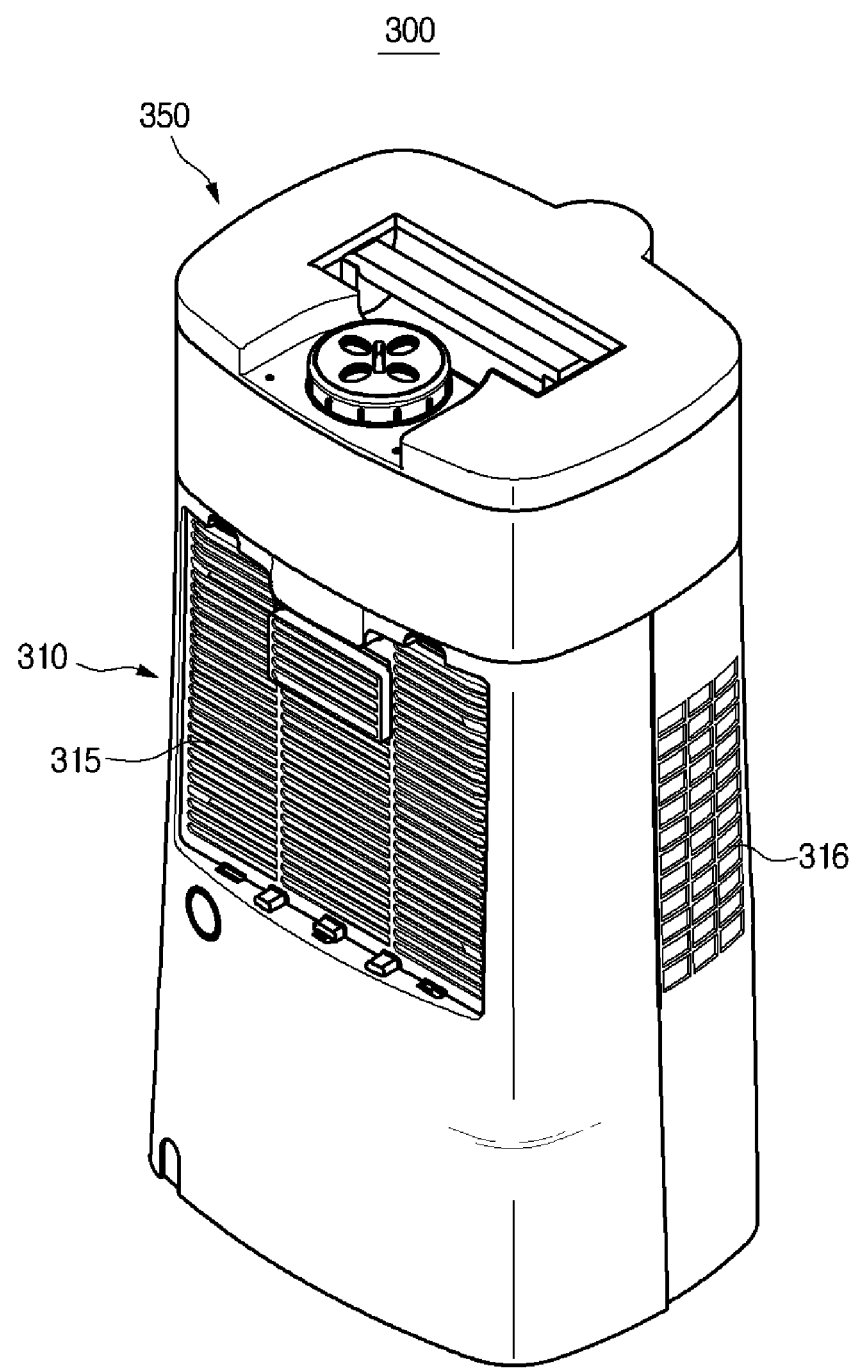
FIG. 18 is a perspective view from a different angle illustrating the external appearance of the appliance for dehumidification of FIG. 17.
Figure 19:
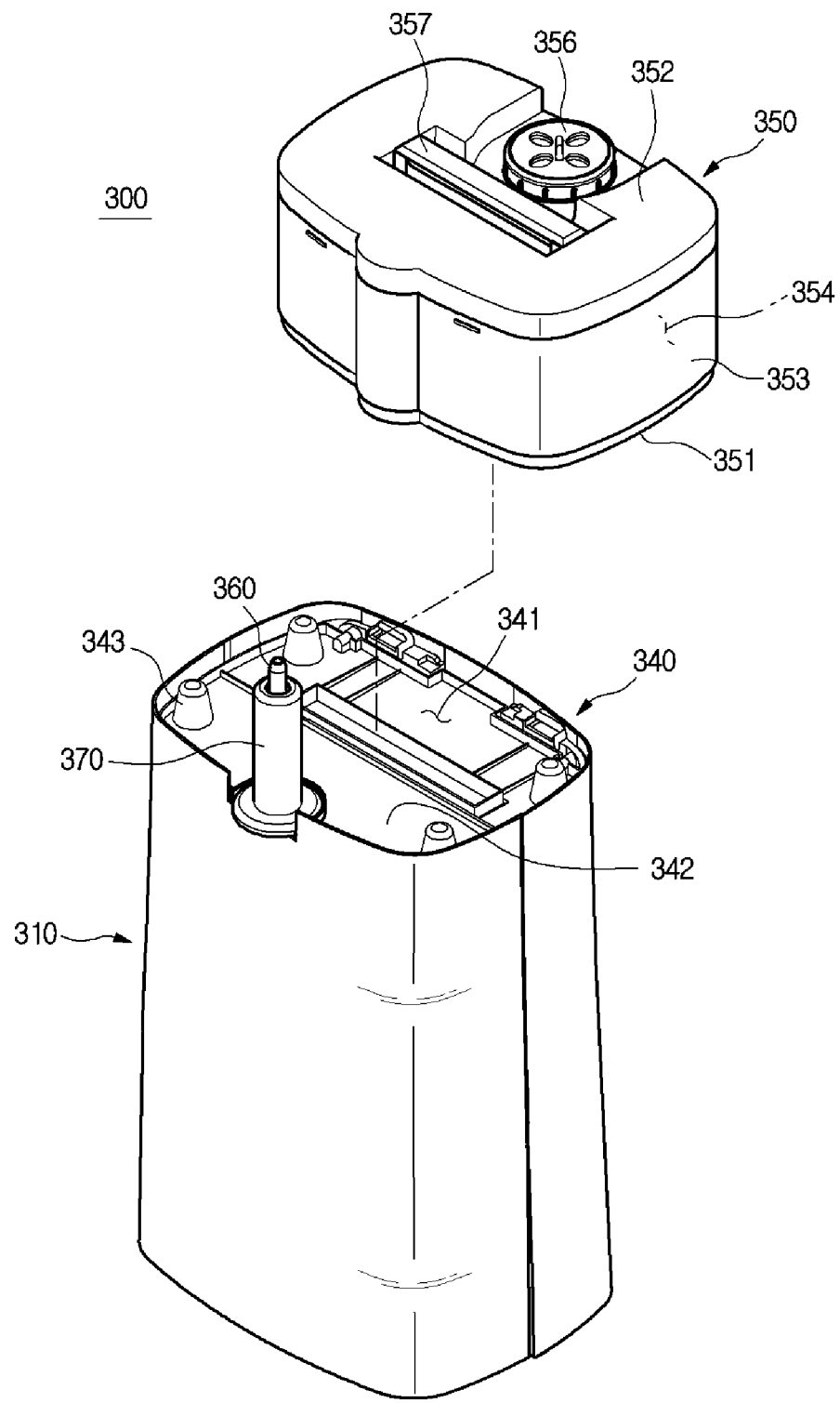
FIG. 19 illustrates a water container separated from the appliance for dehumidification of FIG. 17.
Figure 20:
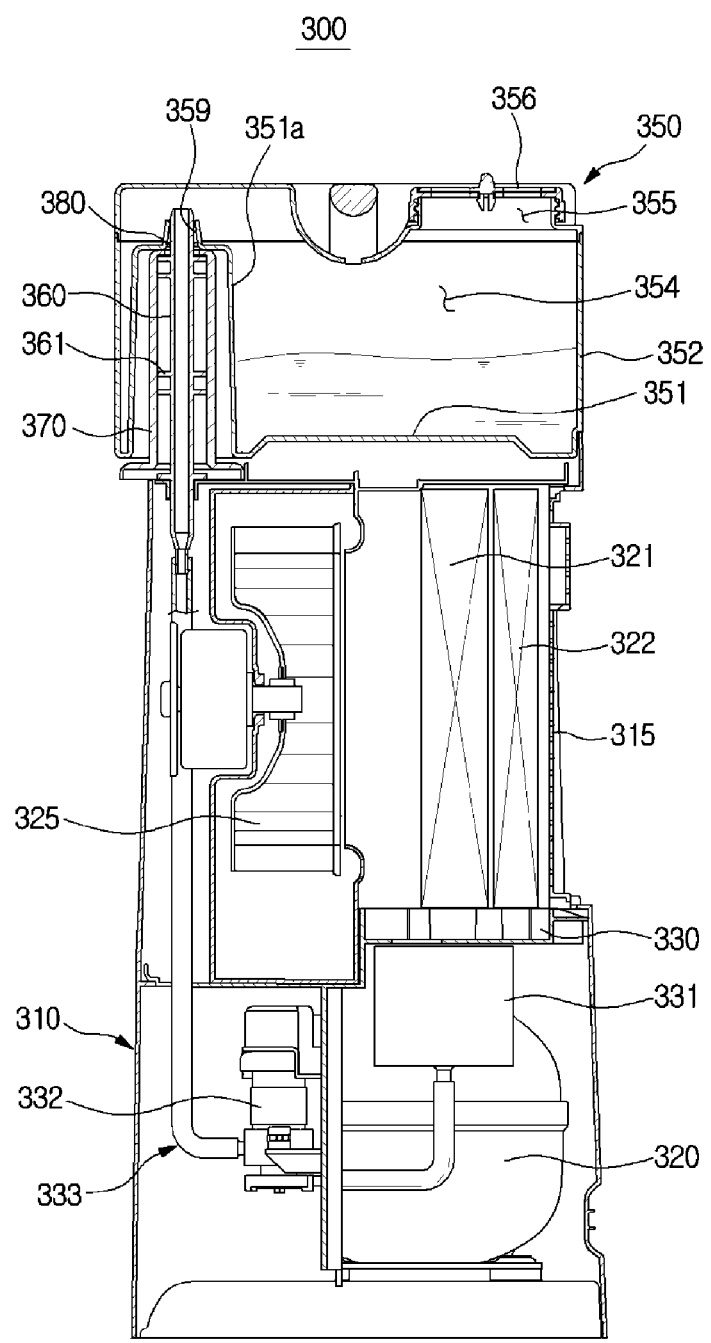
FIG. 20 is a side cross-sectional view of the appliance for dehumidification of FIG. 17.

FIG. 17 is a perspective view of an external appearance of an appliance for dehumidification according to a third embodiment of the present disclosure, FIG. 18 is a perspective view from a different angle illustrating the external appearance of the appliance for dehumidification of FIG. 17, FIG. 19 illustrates a water container separated from the appliance for dehumidification of FIG. 17, and FIG. 20 is a side cross-sectional view of the appliance for dehumidification of FIG. 17.

Referring to FIG. 17 to FIG. 20, the appliance for dehumidification according to the third embodiment of the present disclosure will be described. With respect to the structures that are identical to the previously described structures, the same numeric expressions may be applied, and the descriptions of the structures as such may be omitted.

An appliance for dehumidification 300 includes a body 310 having an inflow unit 315 and an outflow unit 316, a cooling cycle apparatus having a compressor 320 to compress refrigerant, a condenser 321 to condense the refrigerant and emit latent heat to an outside, an expansion valve (not shown) to expand the refrigerant, and an evaporator 322, or a cooling apparatus to absorb latent heat of an outside and to condense the vapor of the surrounding air, a draft fan 325 configured to receive air from the inflow unit 315 and forcedly move the air through the outflow unit 316 after the inflow air is dehumidified through the evaporator 322 and then heated after passing through the condenser 321, a drain duct 330 to guide condensation water generated and descended from the evaporator 322, a water collecting tray 331 to collect the condensation water that is guided by the drain duct 330, a water container 350 detachably provided at an upper portion of the body 310 as to drain the condensation water, a pump 332 to pump the condensation water collected at the water collecting tray 331 to the water container 350, and a drain pipe 333 to guide the condensation water pumped by use of the pump 332 to the water container 350 at the upper portion of the body 310.

The inflow unit 315 of the appliance for dehumidification 300 may be formed at a rear of the body 310, and the outflow unit 316 may be formed at a side of the body 310.

A water container mounting unit 340 at which the water container 350 is mounted may be provided at an upper portion of the body 310. The water container mounting unit 340 may include a mounting space 341 at which the water container 350 is mounted, and a bottom supporting unit 342 to support a bottom unit 351 of the water container 350.

The water container mounting unit 340 may be provided with a guide bump 343 to guide the movement of the water container 350 at the time of mounting the water container 350, and a bump accommodation unit (not shown) configured to accommodate the guide bump 343 while corresponding to the guide bump 343 may be provided at the bottom unit 351 of the water container 350.

The water container mounting unit 340 may be provided with a fixing member (not shown) to fix the mounted water container 350. The water container 350 mounted at the water container mounting unit 340 may be disposed at a higher position than the evaporator 322 or at least at an identical level with respect to the evaporator 322.

The water container 350 may be provided with the bottom unit 351, a side wall unit 353, an upper wall unit 352, and an inside space 354. The upper wall unit 352 of the water container 350 is provided with a drain unit 355 through which the condensation water stored at the water container 350 may be emptied, and a drain cover 356 that may be detachably coupled to the drain unit 355. The water container 350 may be provided with a handle 357 to easily transport the water container 350.

The drain pipe 333 may include an inside extension pipe 360 protruded from the water container mounting unit 340 toward an upper side, and configured to guide condensation water into the inside space 354 of the water container 350 after penetrating through the bottom unit 351 of the water container 350. The inside extension pipe 360 may be supported while accommodated at an inside of a supporting pipe 370 coupled to the body 310. For the above, the inside extension pipe 360 may include a supporting flange 361 protruded toward an inner side surface of the supporting pipe 370.

An inlet unit 359 through which the inside extension pipe 360 is penetrated is formed at the bottom unit 351 of the water container 350. The bottom unit 351 of the water container 350 includes a bulge unit 351$a$ bulged toward an upper side, and the inlet unit 359 may be formed at an upper end of the bulge unit 351$a$. A sealing member 380 may be provided in between the inlet unit 359 and the inside extension pipe 360.

Provided with the structure described above, the water container 350 may be mounted while moving in a direction heading from an upper side to a lower side such that the inside extension pipe 360 may be inserted into the inlet unit 359 of the water container 350.

Figure 21:
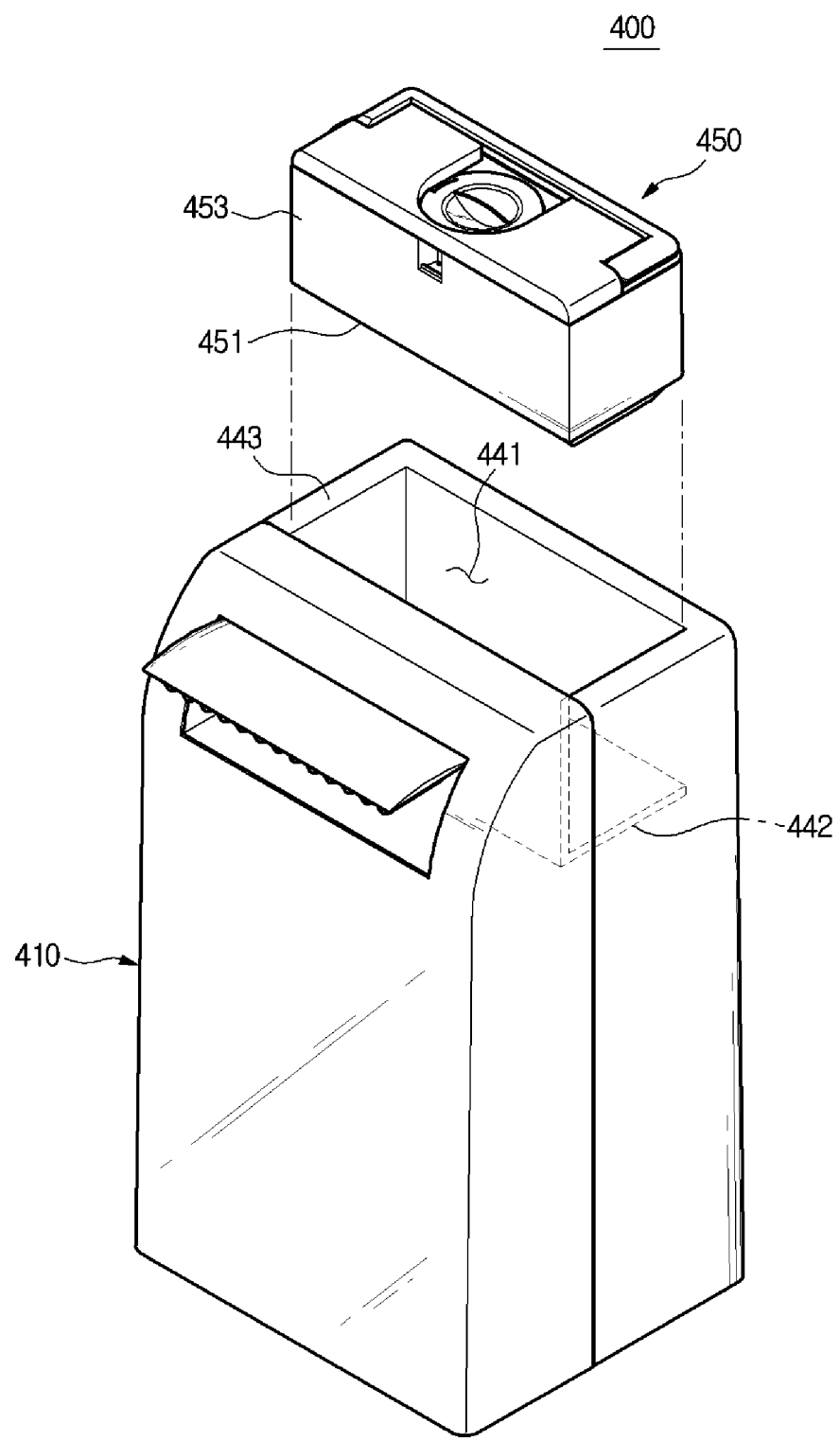
FIG. 21 is a perspective view of an external appearance of an appliance for dehumidification according to a fourth embodiment of the present disclosure.
Figure 22:
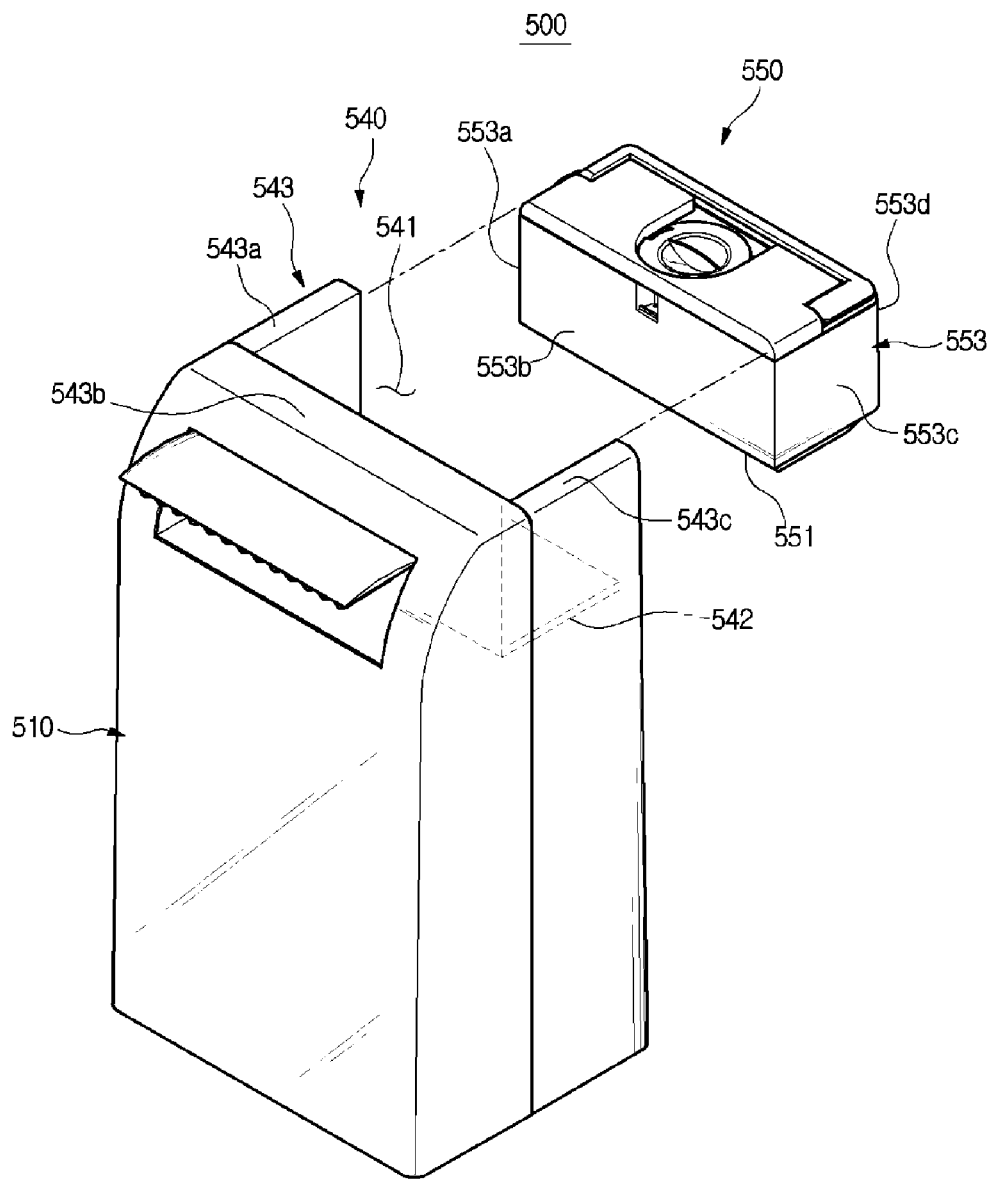
FIG. 22 is a perspective view of an external appearance of an appliance for dehumidification according to a fifth embodiment of the present disclosure.

FIG. 21 is a perspective view of an external appearance of an appliance for dehumidification according to a fourth embodiment of the present disclosure, and FIG. 22 is a perspective view of an external appearance of an appliance for dehumidification according to a fifth embodiment of the present disclosure.

Referring to FIG. 21 and FIG. 22, the appliance for dehumidification according to the fourth embodiment and the fifth embodiment of the present disclosure will be described. With respect to the structures that are identical to the previously described structures, the same numeric expressions may be applied, and the descriptions of the structures as such may be omitted.

As illustrated on FIG. 21, an appliance for dehumidification 400 includes a body 410, and a water container 450 detachably mounted at a water container mounting unit 440 of the body 410.

The water container mounting unit 440 of the appliance for dehumidification 400 includes a mounting space 441 in which the water container 450 is mounted, a bottom supporting unit 442 to support a bottom unit 451 of the water container 450, and a side wall supporting unit 443 to support a side wall unit 453 of the water container 450, and the side wall supporting unit 443 may support the entire side wall unit 453 of the water container 450. That is, the side wall supporting unit 443 may be provided in the shape of a closed loop. The water container 450 may be mounted at the water container mounting unit 440 while moving in a direction heading from an upper side to a lower side. Thus, the water container 450 mounted at the water container mounting unit 440 may be prevented from being moved in forward, backward, left, and right directions, and may be stably supported.

As illustrated on FIG. 22, an appliance for dehumidification 500 includes a body 510, and a water container 550 detachably mounted at a water container mounting unit 540 of the body 510. The water container mounting unit 540 includes a mounting space 541 in which the water container 550 is mounted, a bottom supporting unit 542 to support a bottom unit 551 of the water container 550, and a side wall supporting unit 543 to support a side wall unit 553 of the water container 550, and the side wall supporting unit 543 may support only a portion of the side walls of the side wall unit 553.

That is, assuming that the side wall unit 533 of the water container 550 includes a first side wall 553a, a second side wall 553b, a third side wall, 553c, and a fourth side wall 553d, the side wall supporting unit 543 may include a first side wall supporting unit 543a, a second side wall supporting unit 543b, and a third side wall supporting unit, 543c. Thus, the water container 550 may be mounted at the water container mounting unit 540 while moving in a direction heading from an upper side to a lower side, or the water container 550 may be mounted at the water container mounting unit 540 while moving in a horizontal direction from a side of the water container 550.

Figure 23:
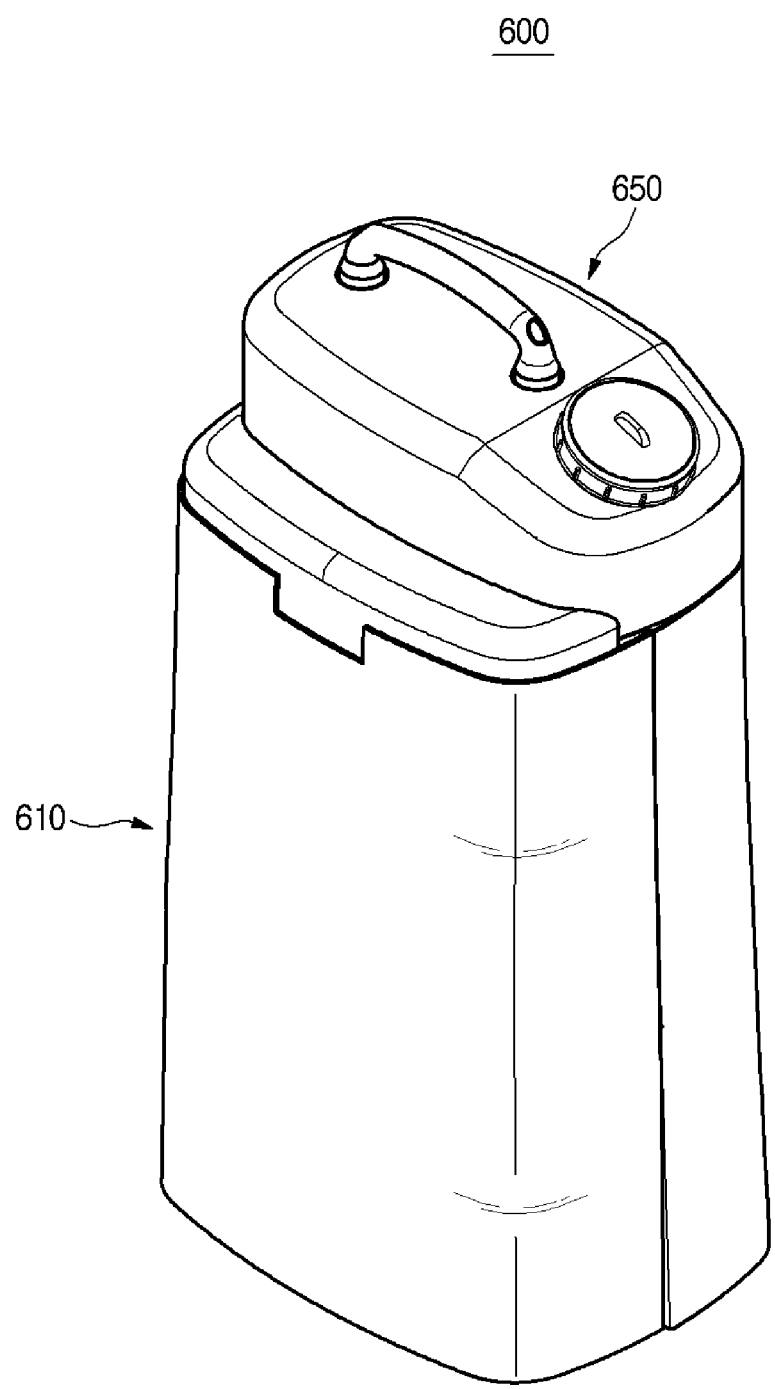
FIG. 23 is a perspective view of an external appearance of an appliance for dehumidification or humidification according to one embodiment of the present disclosure.
Figure 24:
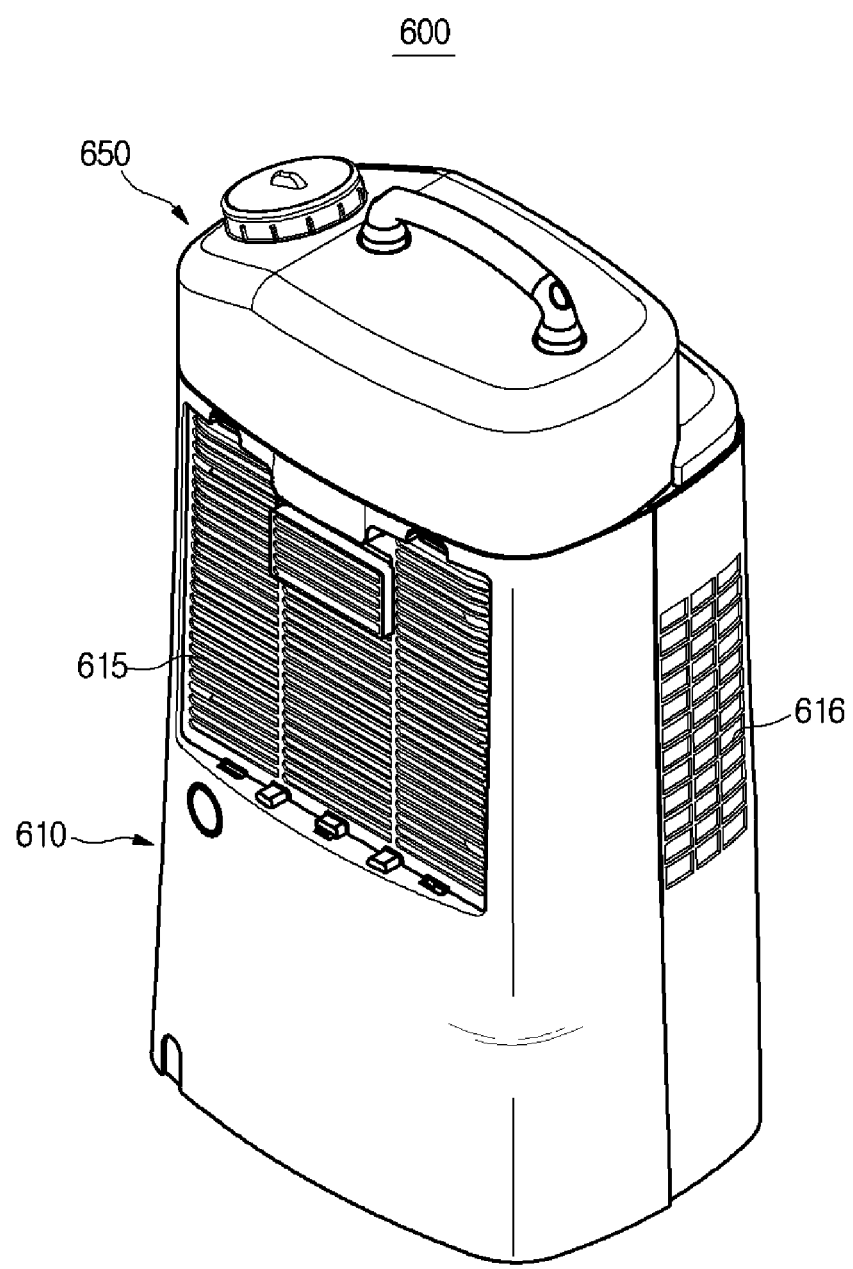
FIG. 24 is a perspective view from a different angle illustrating the external appearance of the appliance for dehumidification or humidification of FIG. 23.
Figure 25:
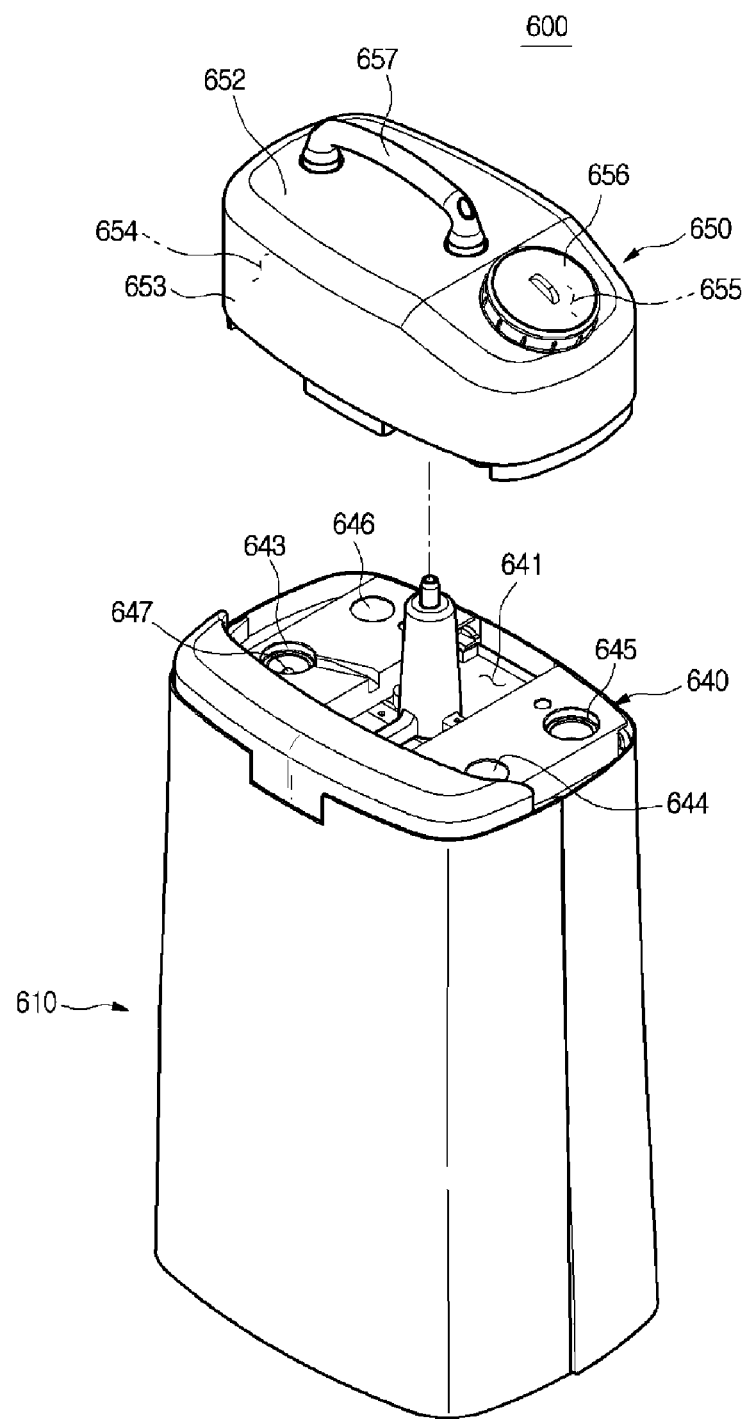
FIG. 25 illustrates a combined water container separated from the appliance for dehumidification or humidification of FIG. 23.
Figure 26:
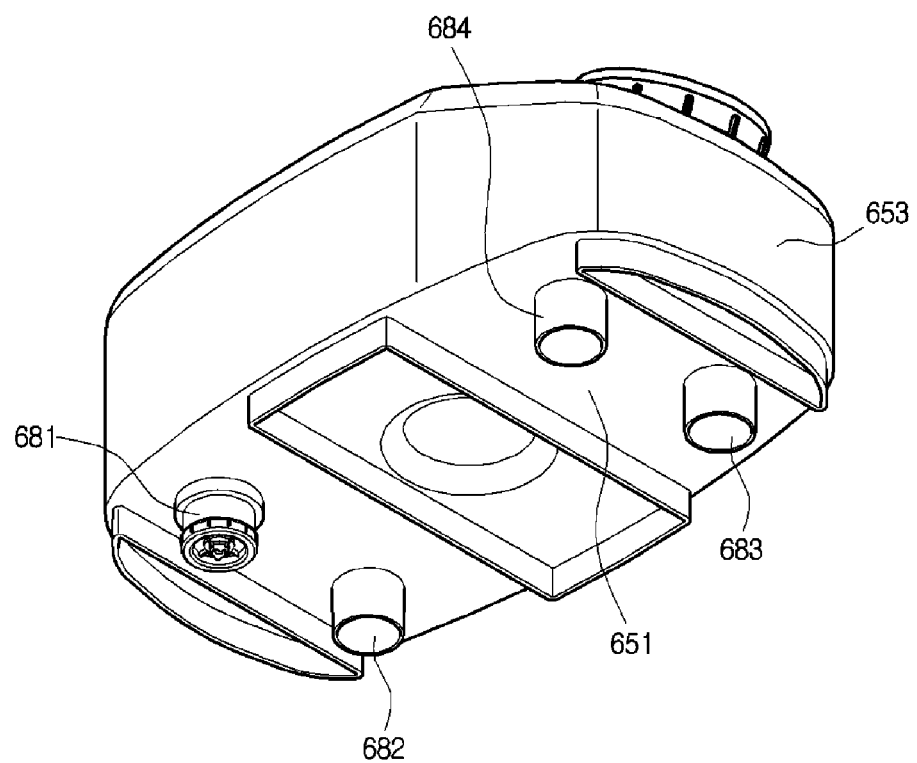
FIG. 26 is a drawing from a different angle illustrating the combined water container separated from the appliance for dehumidification or humidification of FIG. 23.
Figure 27:
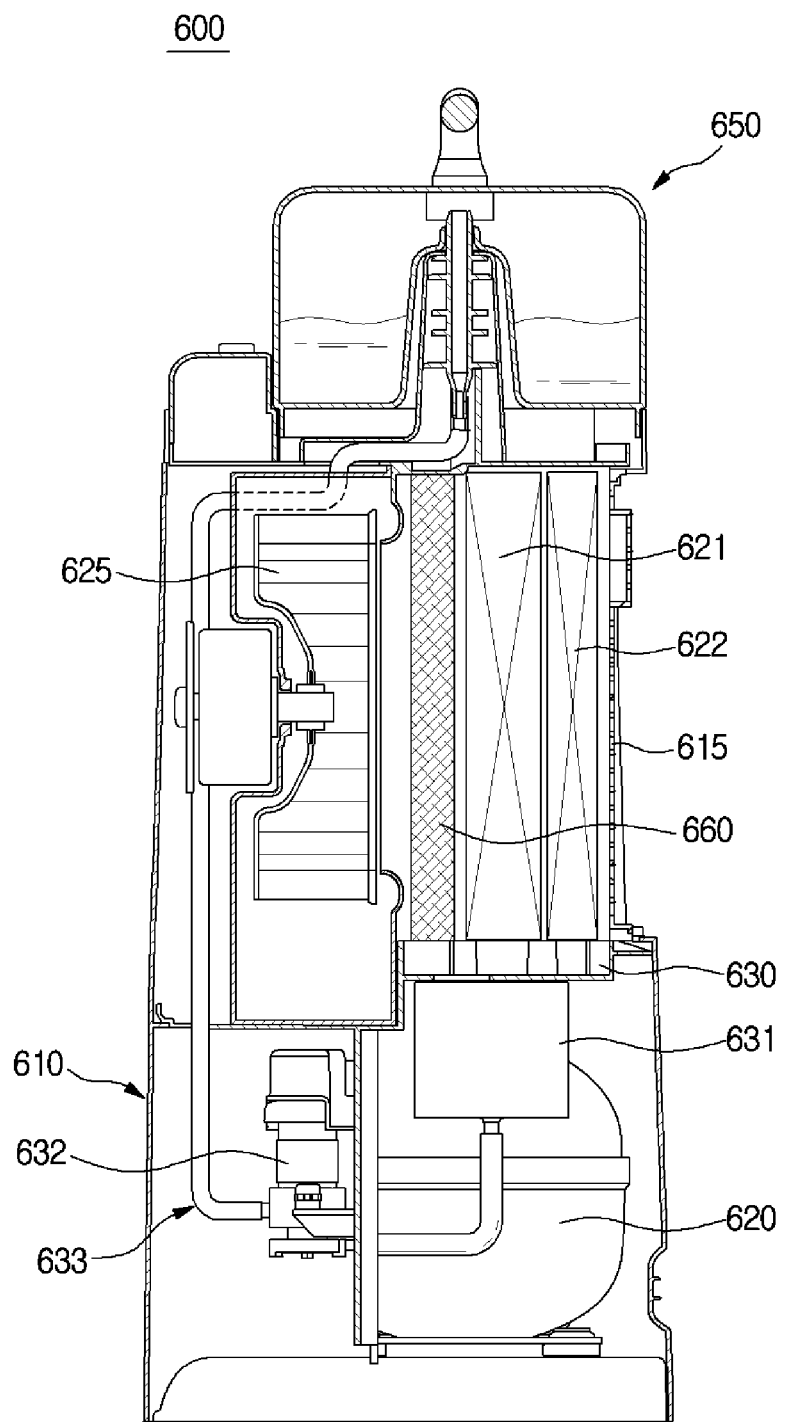
FIG. 27 is a side cross-sectional view of the appliance for dehumidification or humidification of FIG. 23.
Figure 28:
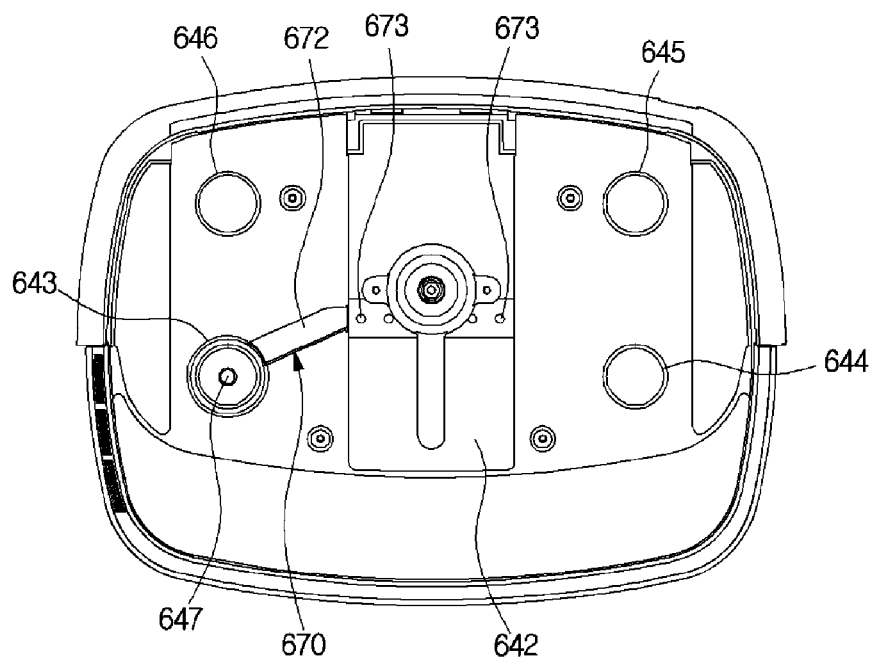
FIG. 28 is a plane view of a combined water container mounting unit of the appliance for dehumidification or humidification of FIG. 23.
Figure 29:
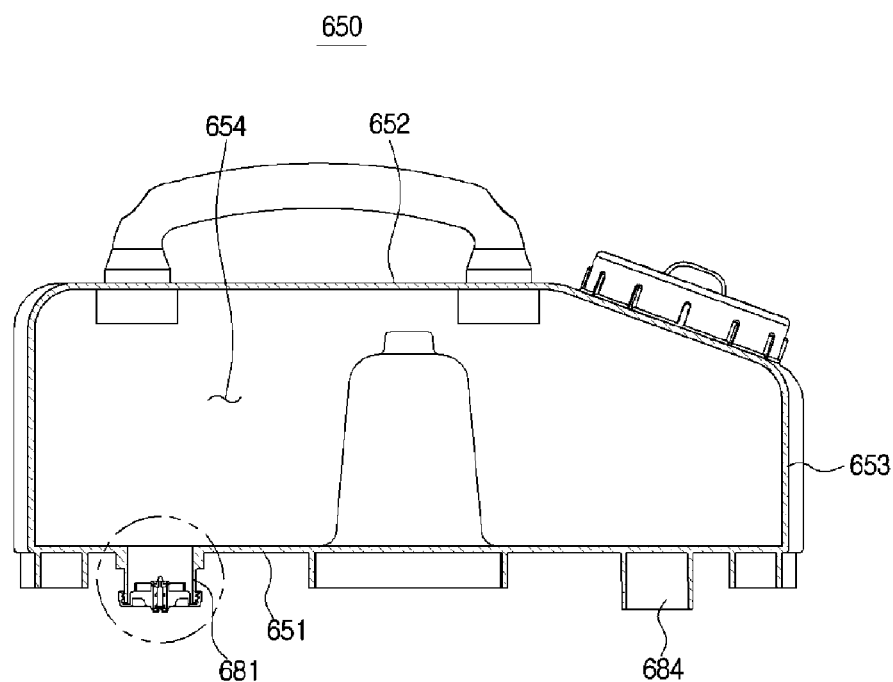
FIG. 29 illustrates an opening/closing member provided at the combined water container as to open/close a humidification water supplying path of the appliance for dehumidification or humidification of FIG. 23.
Figure 30:
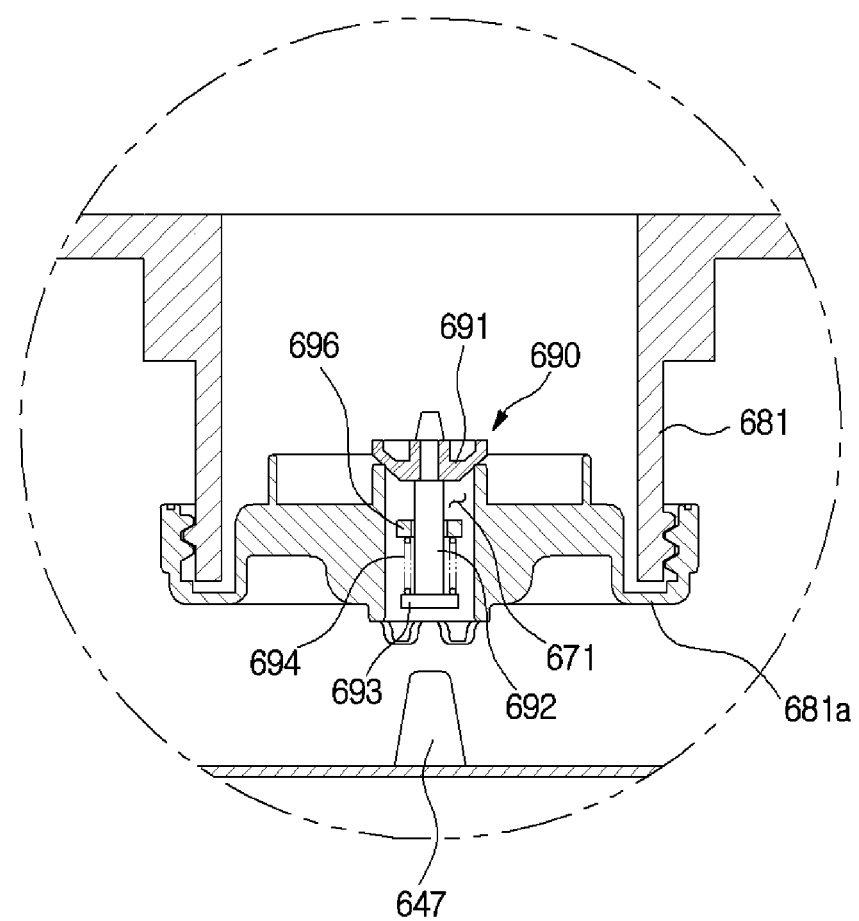
FIG. 30 illustrates a state of the humidification water supplying path closed by use of the opening/closing member of the combined water container of the appliance for dehumidification or humidification of FIG. 23.
Figure 31:
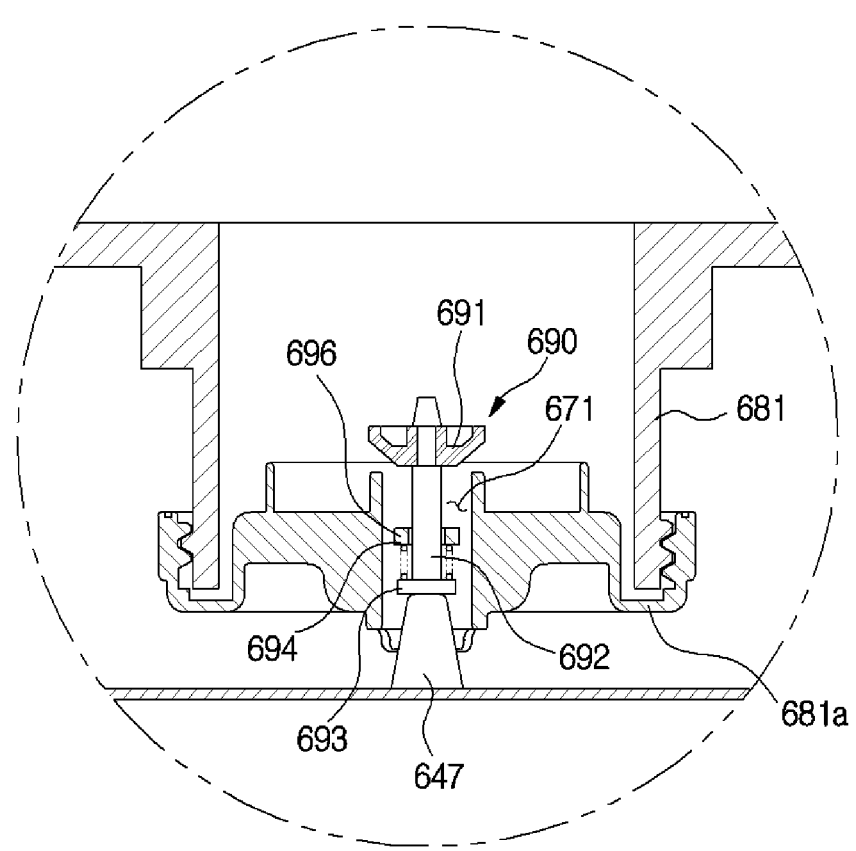
FIG. 31 illustrates a state of the humidification water supplying path open by use of the opening/closing member of the combined water container of the appliance for dehumidification or humidification of FIG. 23.
Figure 32:
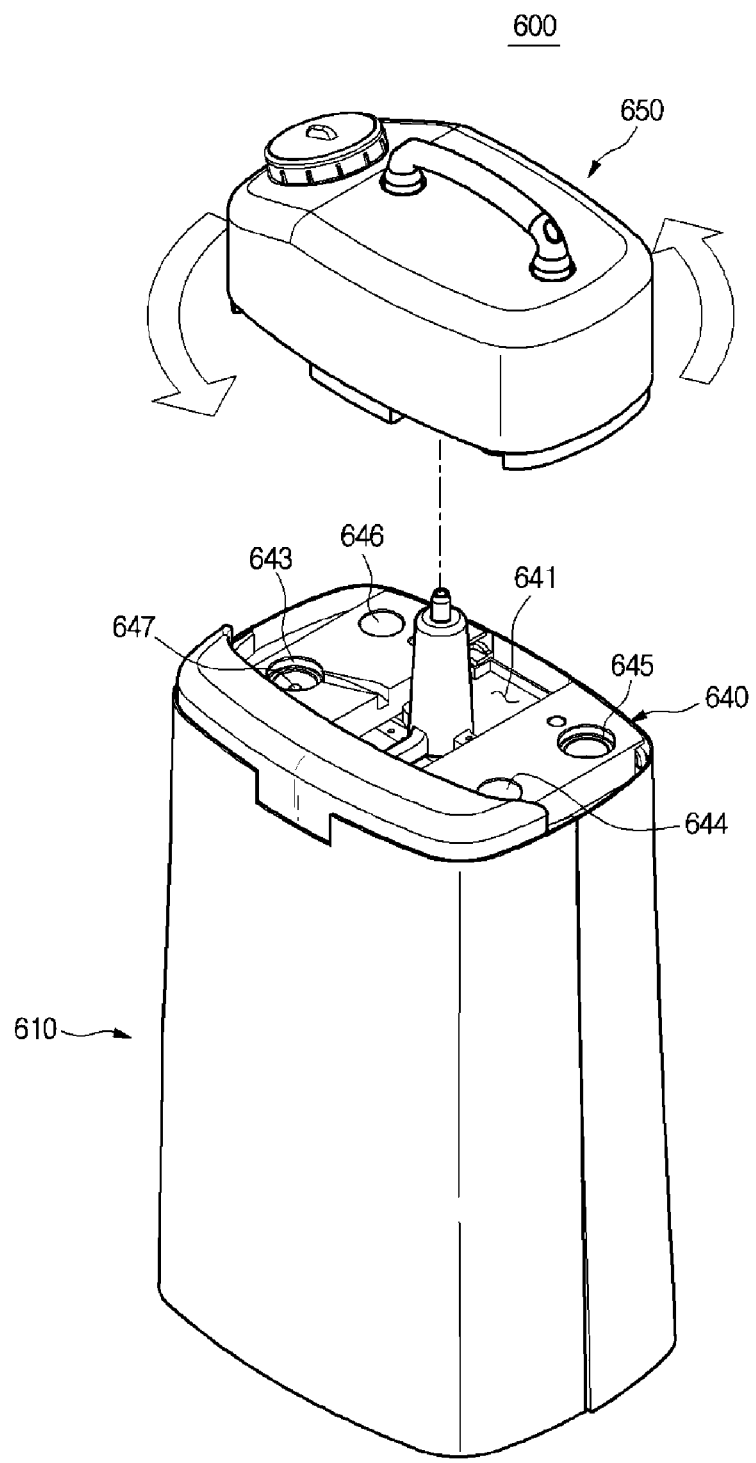
FIG. 32 illustrates a state of the combined water container of the appliance for dehumidification or humidification of FIG. 23 mounted in a different direction.
Figure 33:
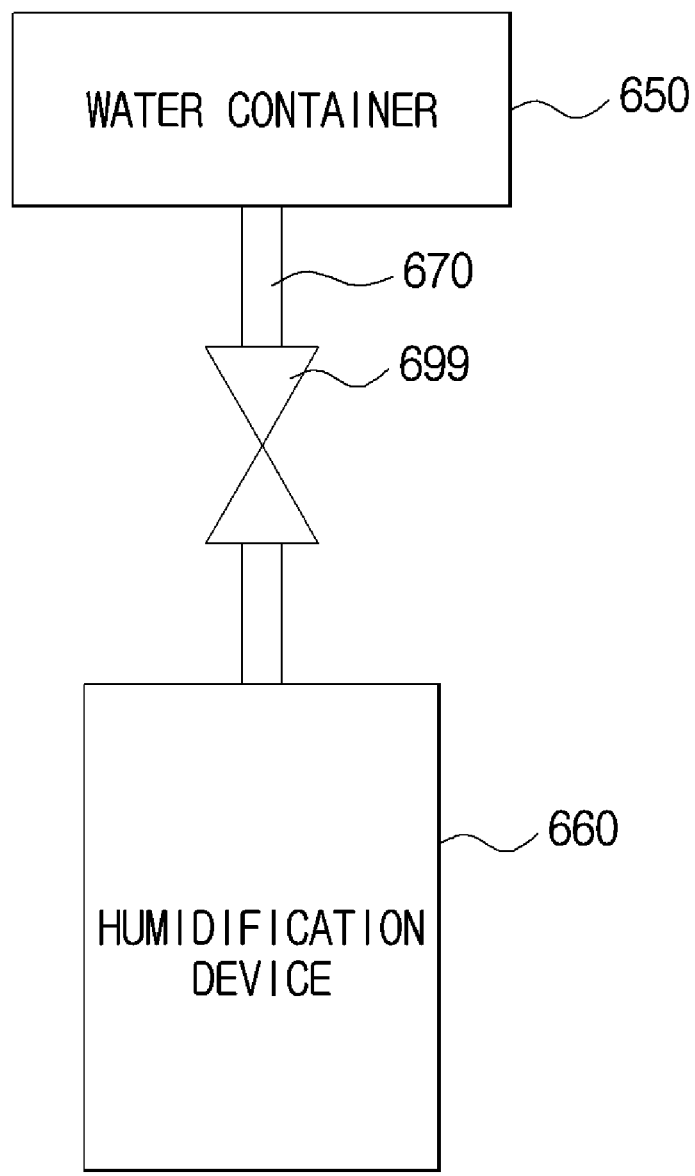
FIG. 33 illustrates an opening/closing valve configured to open/close the humidification water supplying path of the appliance for dehumidification or humidification of FIG. 23.

FIG. 23 is a perspective view of an external appearance of an appliance for dehumidification or humidification according to one embodiment of the present disclosure, FIG. 24 is a perspective view from a different angle illustrating the external appearance of the appliance for dehumidification or humidification of FIG. 23, FIG. 25 is a drawing illustrating a combined water container separated from the appliance for dehumidification or humidification of FIG. 23, FIG. 26 is a drawing from a different angle illustrating the combined water container separated from the appliance for dehumidification or humidification of FIG. 23, FIG. 27 is a side cross-sectional view of the appliance for dehumidification or humidification of FIG. 23, FIG. 28 is a plane view of a combined water container mounting unit of the appliance for dehumidification or humidification of FIG. 23, FIG. 29 illustrates an opening/closing member provided at the combined water container as to open/close a humidification water supplying path of the appliance for dehumidification or humidification of FIG. 23, FIG. 30 illustrates a state of the humidification water supplying path closed by use of the opening/closing member of the combined water container of the appliance for dehumidification or humidification of FIG. 23, FIG. 31 illustrates a state of the humidification water supplying path open by use of the opening/closing member of the combined water container of the appliance for dehumidification or humidification of FIG. 23, FIG. 32 illustrates a state of the combined water container of the appliance for dehumidification or humidification of FIG. 23 mounted in a different direction, and FIG. 33 illustrates an opening/closing valve configured to open/close the humidification water supplying path of the appliance for dehumidification or humidification of FIG. 23.

Referring to FIG. 23 to FIG. 33, the appliance for dehumidification or humidification according to one embodiment of the present disclosure will be described.

An appliance for dehumidification or humidification 600 includes a body 610, a cooling cycle apparatus having a compressor 620 to compress refrigerant, a condenser 621 to condense the refrigerant and emit latent heat to an outside, an expansion valve (not shown) to expand the refrigerant, and an evaporator 622, or cooling apparatus, to absorb latent heat of an outside by evaporating the refrigerant and to condense the vapor around the surrounding air, a draft fan 625 to forcedly move air, a drain duct 630 to guide condensation water generated and descended from the evaporator 622, a water collecting tray 631 to collect the condensation water that is guided by the drain duct 630, a humidification device 660 to perform a humidification of the air by vaporizing humidification water after being supplied with the humidification water, a combined water container 650 detachably provided at an upper portion of the body 610 as to store the condensation water generated at the evaporator 622 during a dehumidification mode or as to store the humidification water to be supplied at the humidification device 660 during a humidification mode, a pump 632 to pump the condensation water collected at the water collecting tray 631 to the combined water container 650, and a drain pipe 633 to guide the condensation water pumped by use of the pump 632 to the combined water container 650 at the upper portion of the body 610.

An inflow unit 615 for air inflow is formed at a front of the body 610, and an outflow unit 616 through which the air dehumidified during a dehumidification mode outflows and the air humidified during a humidification mode outflows is formed at a side of the body.

An upper portion of the body 610 may be provided with a combined water container mounting unit 640 at which the combined water container 650 is mounted. The combined water container mounting unit 640 may include a mounting space 641 through which the combined water container 650 is mounted, and a bottom supporting unit 642 to support the bottom unit 651 of the combined water container 650.

The combined water container 650 mounted at the combined water container mounting unit 640 may be disposed at a higher position than the evaporator 622, or at least at an identical level with respect to the evaporator 622. In addition, the combined water container 650 mounted at the combined water container mounting unit 640 may be disposed at a higher position than the position of the humidification device 660 such that the humidification water of the combined water container 650 may be supplied to the humidification device 660 by use of the weight of the humidification water.

The combined water container 650 is provided with the approximate shape of a box, and includes the bottom unit 651, a side wall unit 653, an upper wall unit 652, and an inside space 654. The inside space 654 of the combined water container 650 is provided with condensation water stored therein during a humidification mode, and with humidification water stored therein during a humidification mode.

The upper wall unit 652 of the combined water container 650 is provided with a drain unit 655 capable of emptying the condensation water stored at the combined water container 650, and a drain cover 656 may be detachably coupled to the drain unit 655. Differently from the present embodiment of the present disclosure, a humidification water inlet unit to supply humidification water may be separately provided. The combined water container 650 may be provided with a handle 657 to easily transport the combined water container 650.

The appliance for dehumidification or humidification 600 includes a humidification water supplying path 670 (FIG. 28) to guide the humidification water of the combined water container 650 to the humidification device 660. The humidification water supplying path 670 is closed during a dehumidification mode, and is open during a humidification mode.

The humidification water supplying path 670 may include a humidification water outflow unit 671 (FIG. 30) formed at the bottom unit 651 of the combined water container 650, a guide groove 672 formed at an upper surface of the bottom supporting unit 642 of the combined water container mounting unit 640, and a guide penetration hole 673 penetrating the bottom supporting unit 642.

The humidification water that outflows from the combined water container 650 through the humidification water outflow unit 671 is guided to the guide penetration hole 673 along the guide groove 672, and may be guided to the humidification device 660 after penetrating through the bottom supporting unit 642 through the guide penetration hole 673.

The opening and closing of the humidification water supplying path 670 in the present embodiment may be determined according to the mounting direction of the combined water container 650.

That is, the bottom unit 651 of the combined water container 650 is provided in bilateral symmetry, and the bottom supporting unit 642 of the combined water container mounting unit 640 as well is provided in bilateral symmetry while corresponding to the above. Thus, the combined water container 650 may be mounted at the combined water container mounting unit 640 in a plurality of directions. When the combined water container 650 is mounted in a first direction from the plurality of directions, the humidification water supplying path 670 is closed so that a dehumidification mode may be provided, and when the combined water container 650 is mounted in a second direction from the plurality of directions, the humidification water supplying path 670 is open so that a humidification mode is provided. The position of the combined water container 650 in the first direction and the position of the combined water container 650 in the second direction may be opposite to each other by about 180°.

The bottom unit 651 of the combined water container 650 is provided with a plurality of coupling bump units 681, 682, 683, and 684, and the bottom supporting unit 642 of the combined water container mounting unit 640 may be provided with a plurality of bump accommodation units 643, 644, 645, and 646 at which the plurality of coupling bump units 681, 682, 683, and 684 is accommodated.

The coupling bump unit 681 of the plurality of coupling bump units 681, 682, 683, and 684 may be provided with the humidification water outflow unit 671 through which the condensation water of the combined water container 650 outflows, an opening/closing member 690 movably provided to open/close the humidification water outflow unit 671, and an elastic member 694 to elastically bias the opening/closing member 690 in a direction to close the humidification water outflow unit 671.

The coupling bump unit 681 is provided to be open, and a cap member 681*a* may be coupled to the coupling bump unit 681 as to close the coupling bump unit 681. The humidification water outflow unit 671 may be formed at the cap member 681*a*.

The opening/closing member 690 may include a sealing member 691 to open/close the humidification water outflow unit 671, a pressing unit 693 pressed by a pressing bump 647, which is to be described later, and a rod unit 692 extended in between the sealing member 691 and the pressing unit 693.

One end of the elastic member 694 is supported at the pressing unit 693, and the other end of the elastic member 694 may be supported at an elastic member supporting unit 696.

The bump accommodation unit 643 of the plurality of bump accommodation units 643, 644, 645, and 646 may be provided with the pressing bump 647, which is protruded to pressurize the opening/closing member 690 in a direction to open the humidification water outflow unit 671, is formed thereto.

Thus, when the coupling bump unit 681 of the plurality of coupling bump units 681, 682, 683, and 684, which is provided with humidification water outflow unit 671 formed thereto, is settled at the bump accommodation unit 643 of the plurality of bump accommodation units 643, 644, 645, and 646, which is provided with the pressing bump 647 formed thereto, the humidification water outflow unit 671 may be open as the pressing bump 647 presses the opening/closing member 690. In other cases, the humidification water outflow unit 671 may be closed (FIG. 32).

As the above, by use of a simple instrumental structure, the humidification water supplying path 670 may be open/closed, and may select a dehumidification mode or a humidification mode. However, the opening/closing structure of the humidification water supplying path 670 is not limited hereto.

As illustrated on FIG. 33, an opening/closing valve 699 is provided at the humidification water supplying path 670, and the humidification water supplying path 670 may be open/closed according to the motion of the opening/closing valve 699.

The opening/closing valve 699 may be an automatic type, or a manual type. As one example, the opening/closing valve 699 may be a valve driven by use of a step motor, or a solenoid valve using an electromagnet.

The humidification device 660 may be a humidification filter to absorb humidification water. The humidification filter may be formed with fiber material. Humidification water may be vaporized while descending along the humidification filter. The draft fan 625 may forcedly move air so that the humidification water is easily vaporized. The condenser 621 and the evaporator 625 may perform a role as a humidification device.

Figure 34:
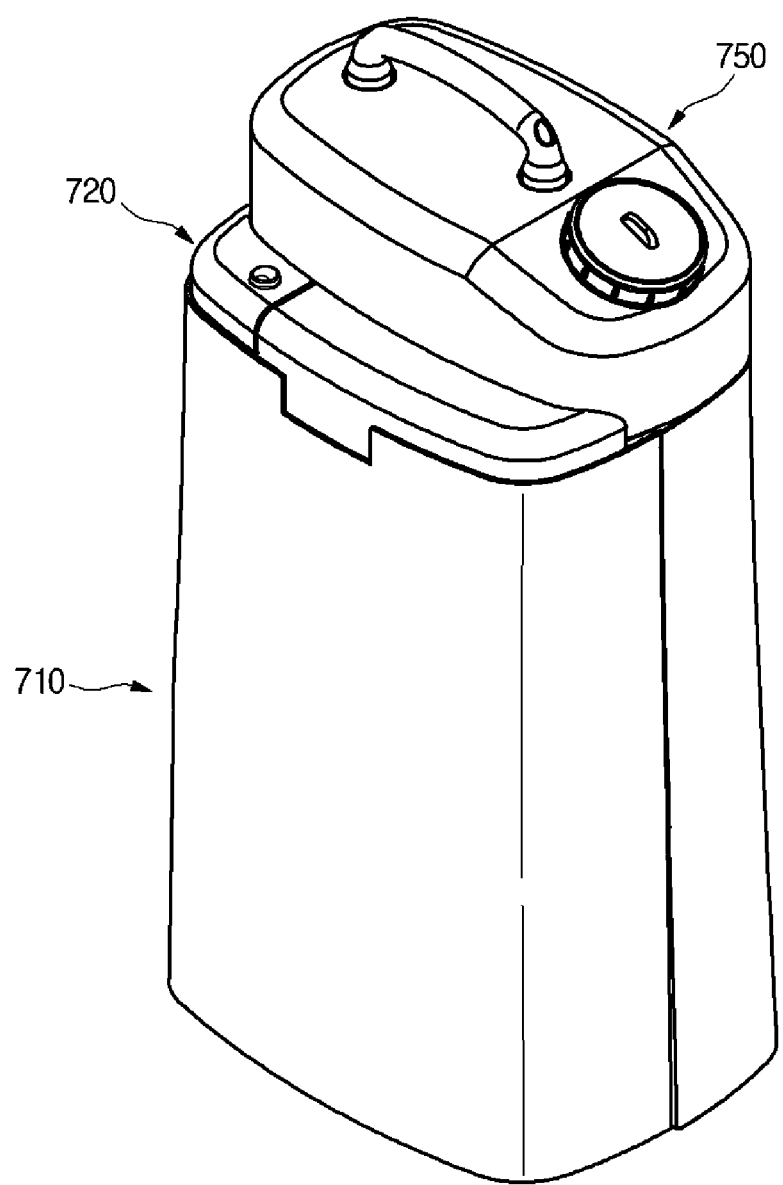
FIG. 34 illustrates an example of an ultrasonic vibrator being used as a humidification device of the appliance for dehumidification or humidification of FIG. 23.
Figure 35:
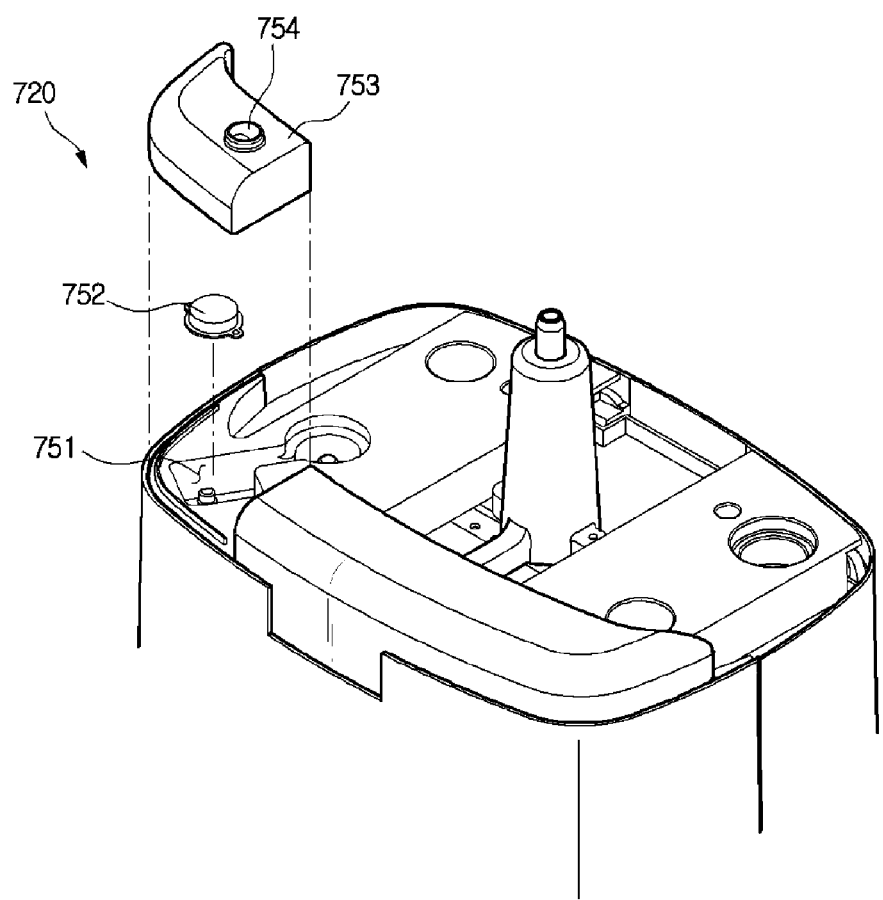
FIG. 35 illustrates a humidification unit of the appliance for dehumidification or humidification of FIG. 34.

FIG. 34 illustrates an example of an ultrasonic vibrator being used as a humidification device of the appliance for dehumidification or humidification of FIG. 23, and FIG. 35 illustrates a humidification unit of the appliance for dehumidification or humidification of FIG. 34.

A body 710 of an appliance for dehumidification or humidification 700 may be provided with a humidification unit 720. The humidification unit 720 may include a humidification tank 751 to store the humidification water supplied from a combined water container 750, an ultrasonic vibrator 752 to vibrate humidification water while provided at the humidification tank 751, and a humidification cover 753 to seal the humidification tank 751. The humidification cover 753 may be provided with an outflow unit 754 through which the humidified air outflows.

Other than the ultrasonic vibrator 752, a heater or an electrode bar to boil and heat humidification water may be used as a humidification device.

Figure 36:
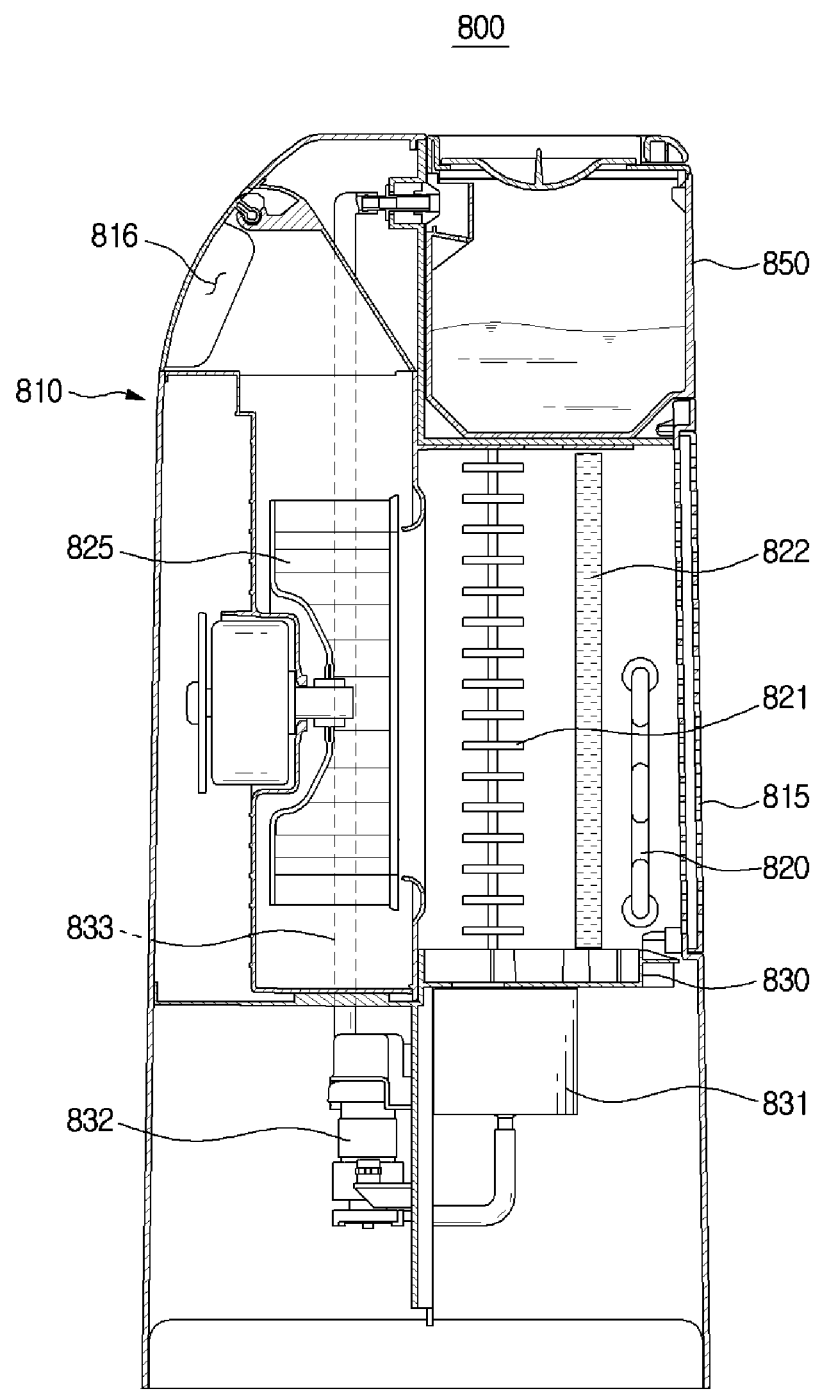
FIG. 36 schematically illustrates main structures of an appliance for dehumidification according to still another embodiment of the present disclosure.

FIG. 36 illustrates main structures of an appliance for dehumidification according to still another embodiment of the present disclosure. With respect to the structures that are identical to the previously described embodiments, the descriptions of the structures as such may be omitted.

As described above, an appliance for dehumidification 800, other than the method of using the cooling cycle apparatus, may perform a dehumidification by a method using adsorbent material 822. The appliance for dehumidification 800 may include the adsorbent material 822 to adsorb vapor, a heater 820 to generate heated air, a heat-exchanging apparatus 821 to condense vapor, and a draft fan 825 to forcedly move air. As for the adsorbent material 822, zeolite, activated carbon, or silica gel may be used.

Air inflows through an inflow unit 815, the vapor included in the air is adsorbed at the adsorbent material 822, the water adsorbed at the adsorbent material 822 is vaporized by use of heated air of the heater 820, and the vaporized water may be condensed while making contact with the heat-exchanging apparatus 821. The air that is dried may outflow through an outflow unit 816.

The condensation water generated at the heat-exchanging apparatus 821 is collected at a water collecting tray 831 after being guided by a drain duct 830, and the condensation water of the water collecting tray 831 may be pumped to a water container 850 detachably provided at an upper portion of a body 810. Here, the heat-exchanging apparatus 821, has not only a cooling apparatus to cool an outside by evaporating refrigerant, but includes the entirety of the members that may condense vapor by simply exchanging heat with the vapor.

A drain pipe 833 is provided to connect the water collecting tray 831 and the water container 850 by a pump 832, and may guide the condensation water being pumped to the water container 850.

As the above, the aspect of the present disclosure may be applied to an appliance for dehumidification having a method of performing a dehumidification by use of adsorbent material and then performing a condensation after vaporizing the adsorbed water, other than the method of performing a dehumidification by use of a cooling cycle apparatus. Furthermore, when condensation water is generated after performing a dehumidification, the aspect of the present disclosure may be widely applied to other appliances for dehumidification having different methods.

Figure 37:
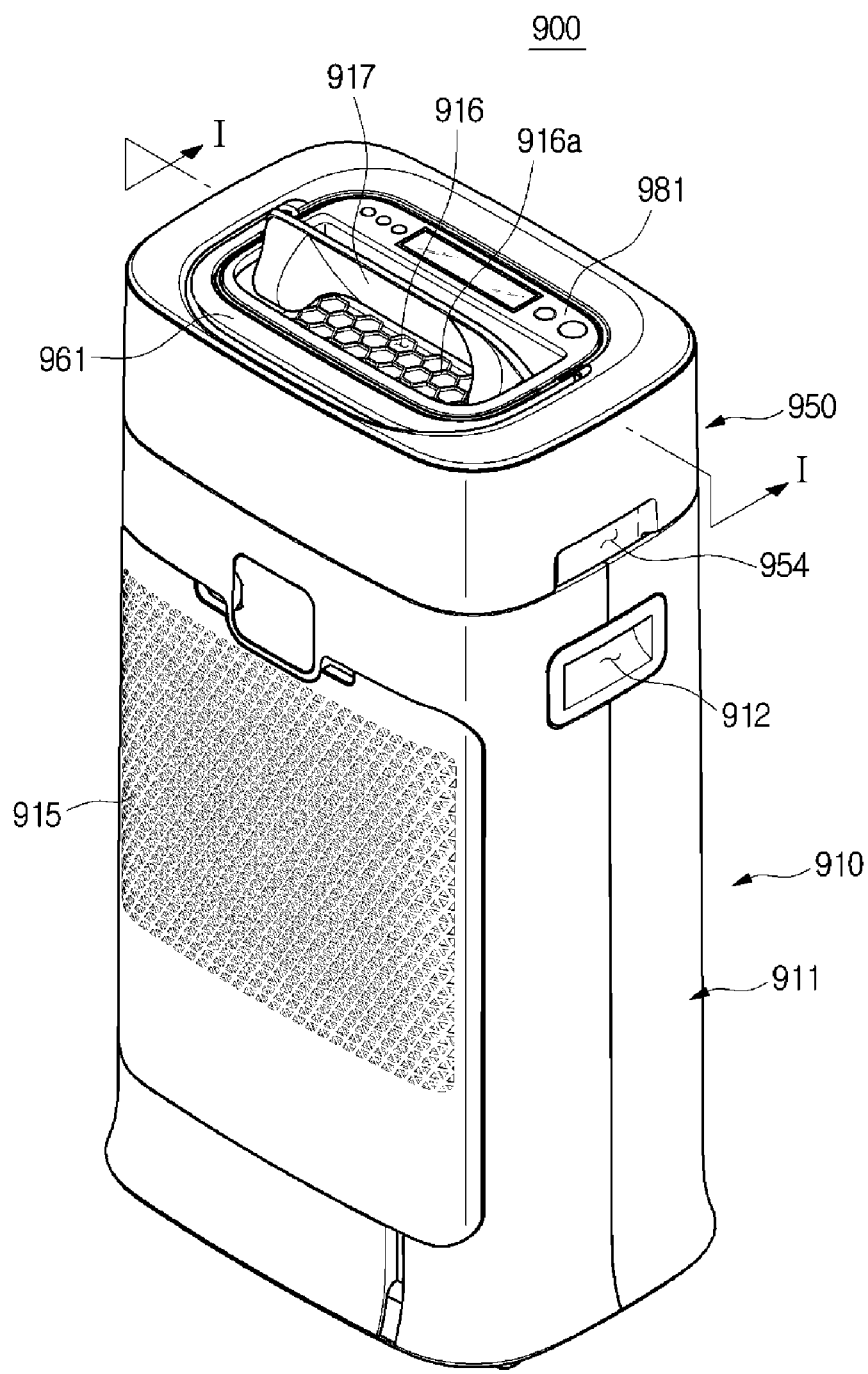
FIG. 37 is a perspective view of an external appearance of an appliance for dehumidification according to a sixth embodiment of the present disclosure.
Figure 38:
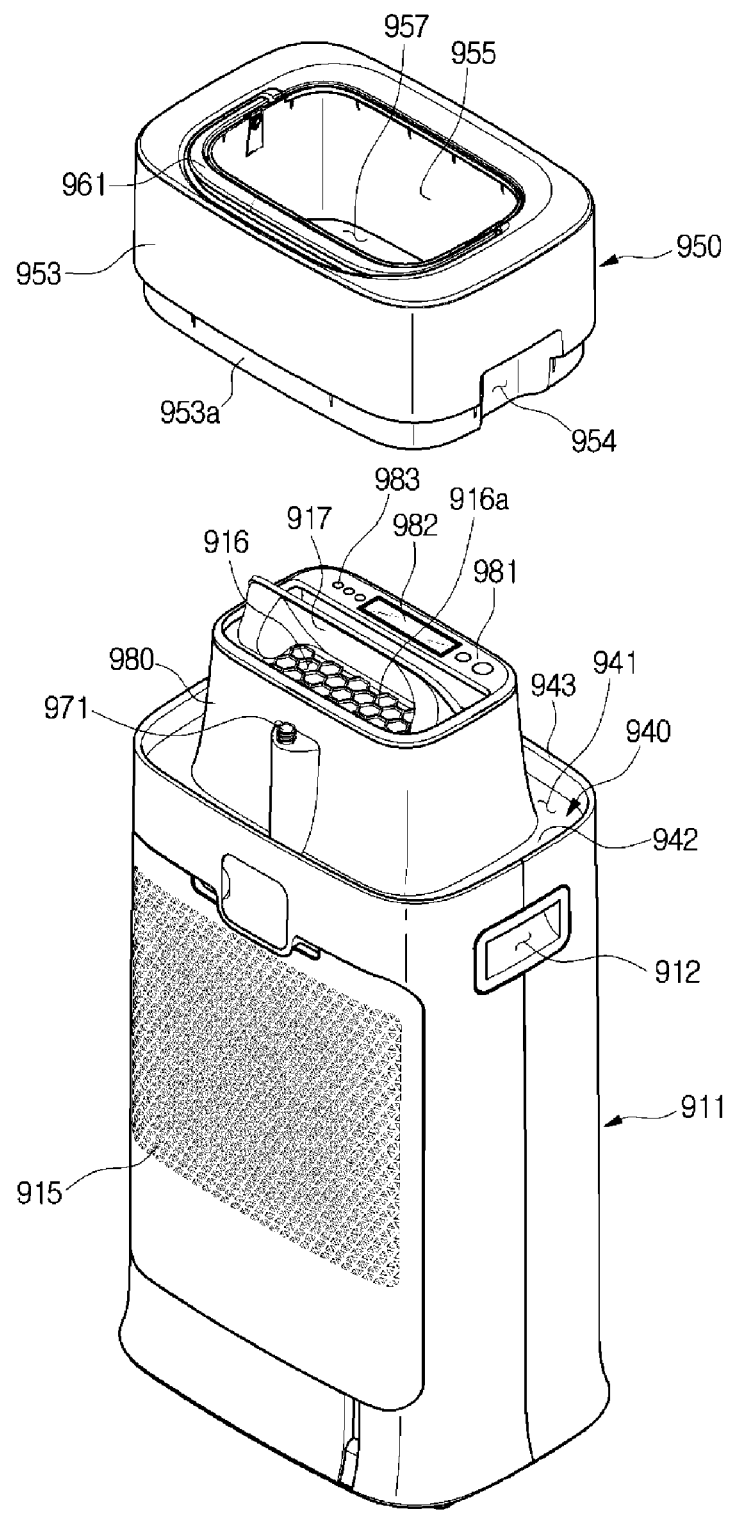
FIG. 38 illustrates a water container separated from a body of the appliance for dehumidification of FIG. 37.
Figure 39:
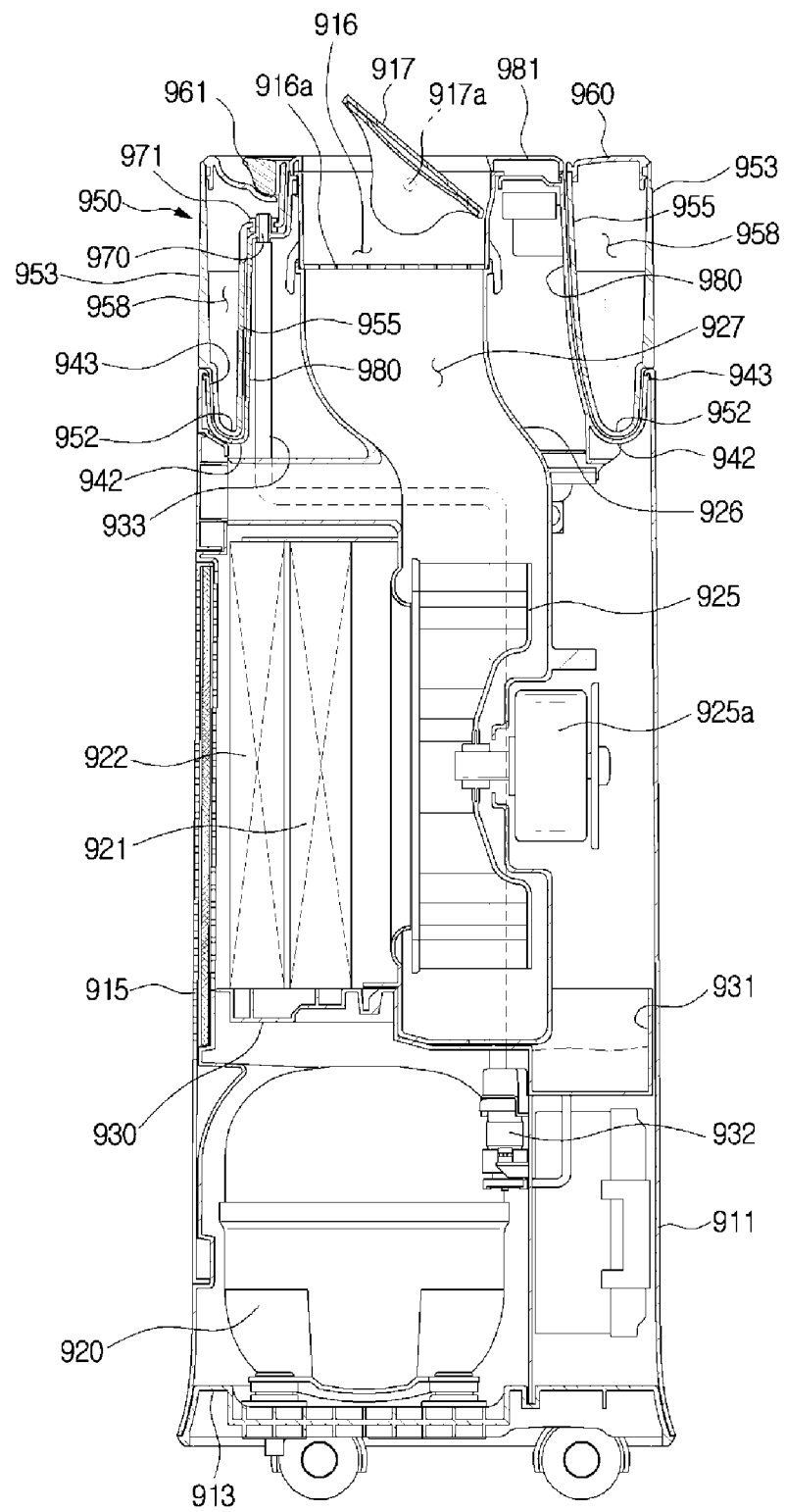
FIG. 39 is a side cross-sectional view of the appliance for dehumidification of FIG. 37.
Figure 40:
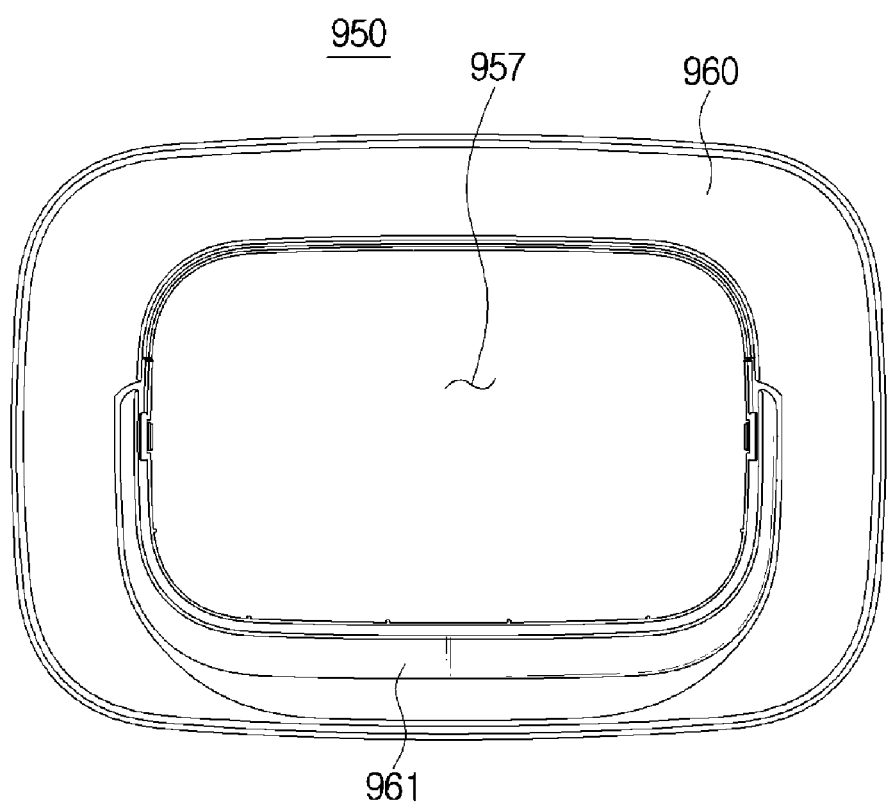
FIG. 40 is a plane view illustrating the water container of the appliance for dehumidification of FIG. 37.
Figure 41:
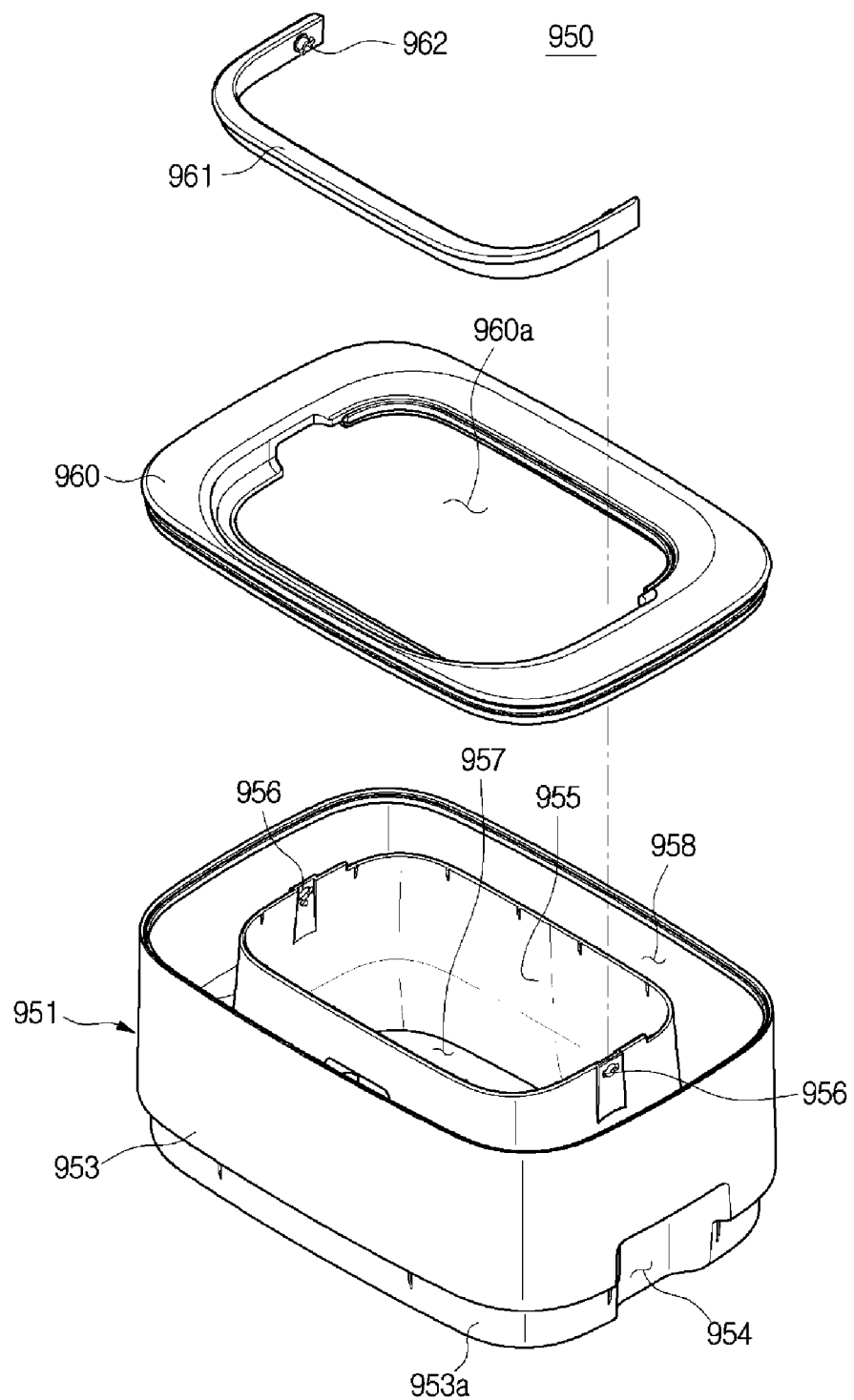
FIG. 41 illustrates the disassembled water container of the appliance for dehumidification of FIG. 37.
Figure 42:
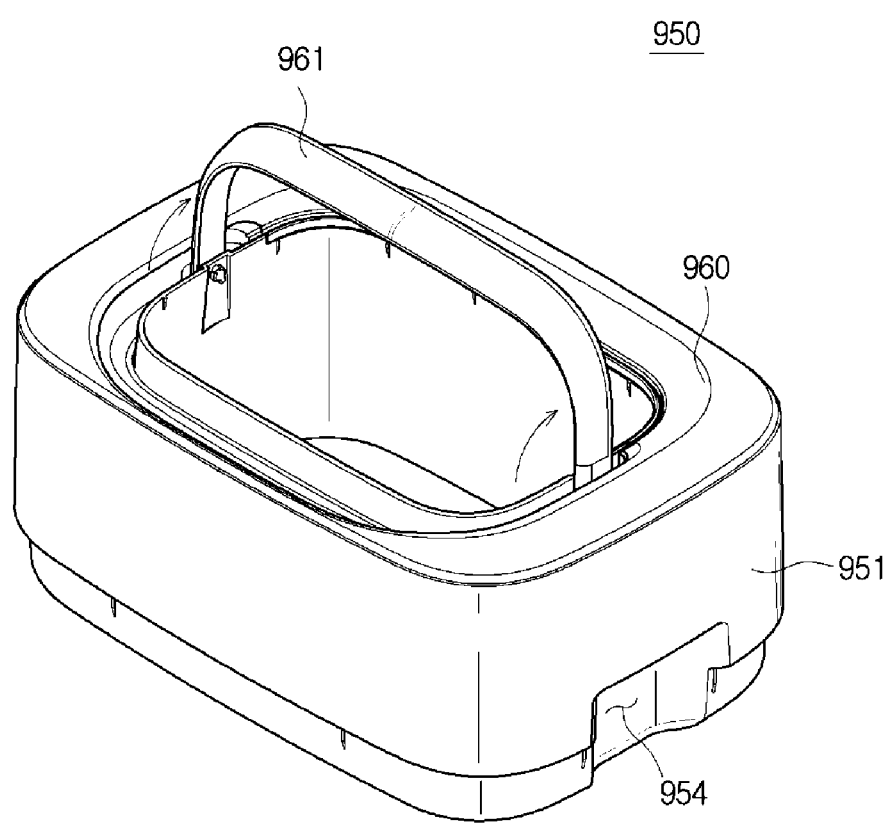
FIG. 42 illustrates a state of an upper handle of the appliance for dehumidification of FIG. 37 upwardly rotated.
Figure 43:
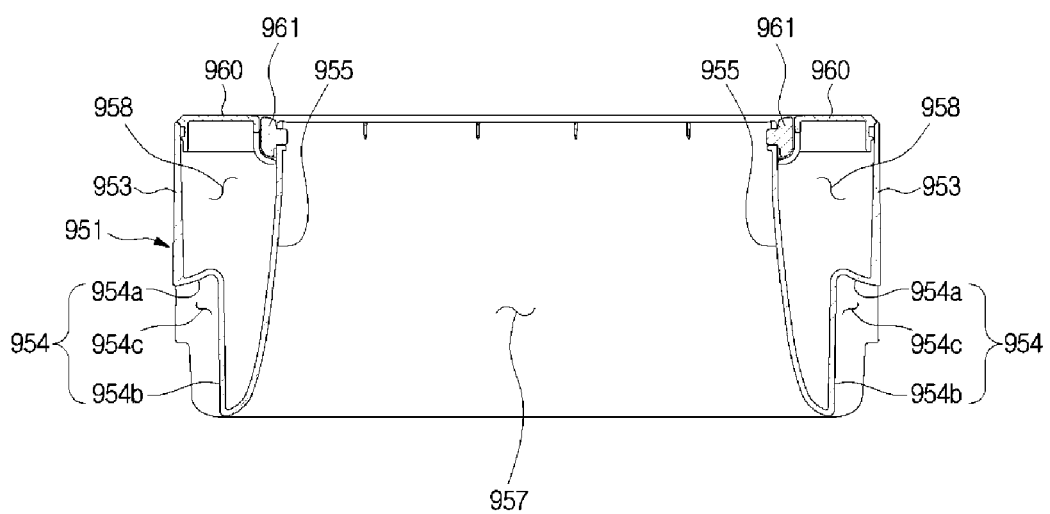
FIG. 43 is a cross-sectional view along an I-I line of the water container of the appliance for dehumidification of FIG. 37.
Figure 44:
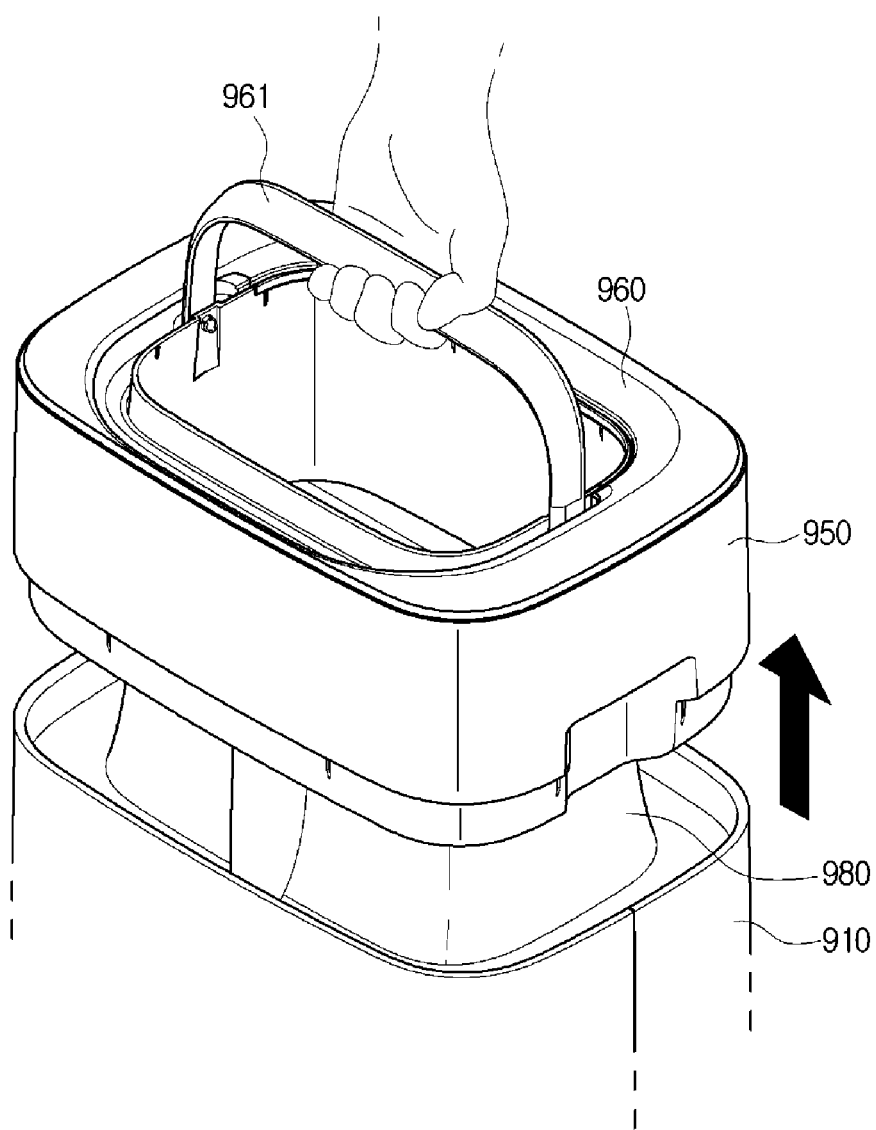
FIG. 44 and FIG. 45 are drawings showing motions of separating the water container and draining water by use of the upper handle.
Figure 45:
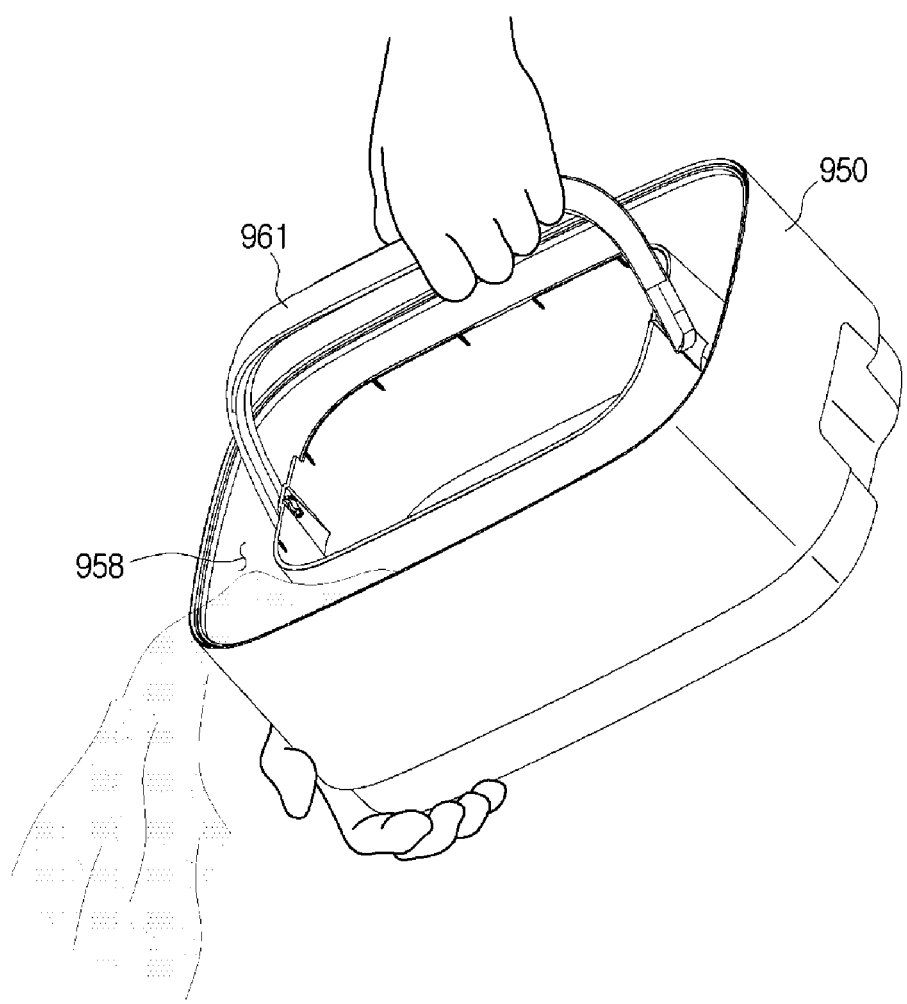
Figure 46:
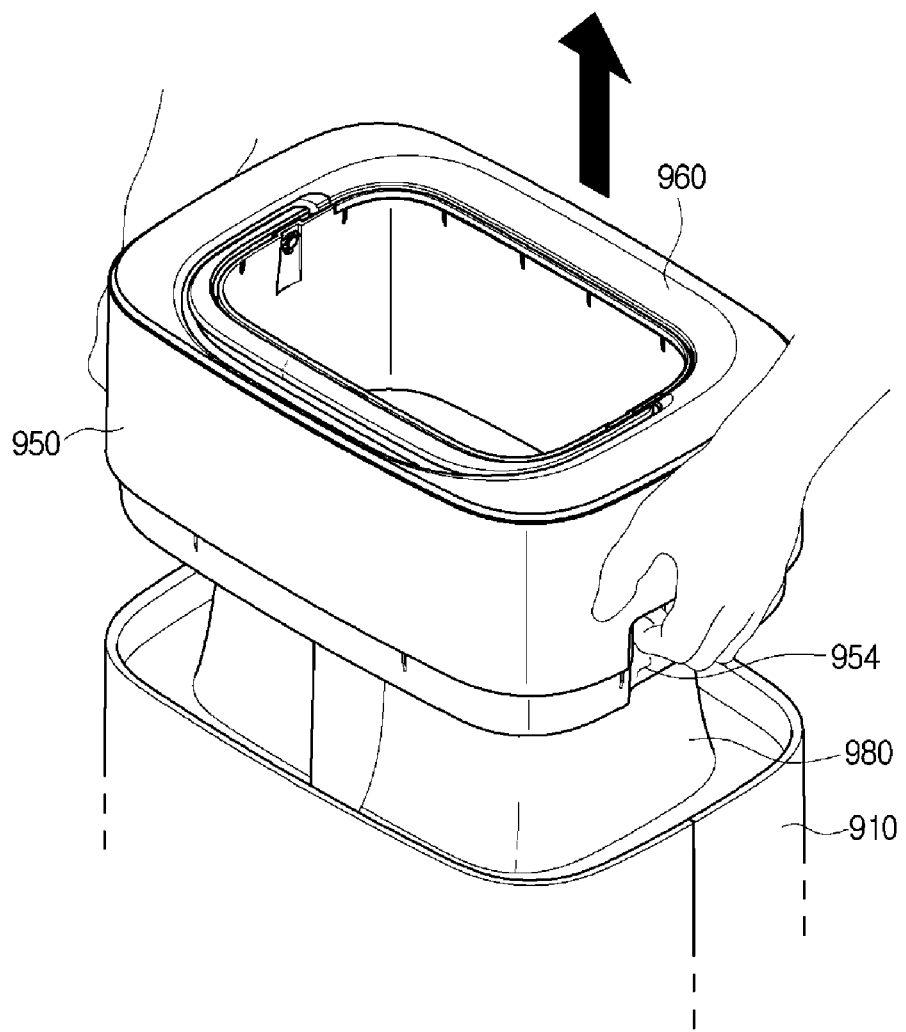
FIG. 46 and FIG. 47 are drawings showing motions of separating the water container and draining water by use of a side handle.
Figure 47:
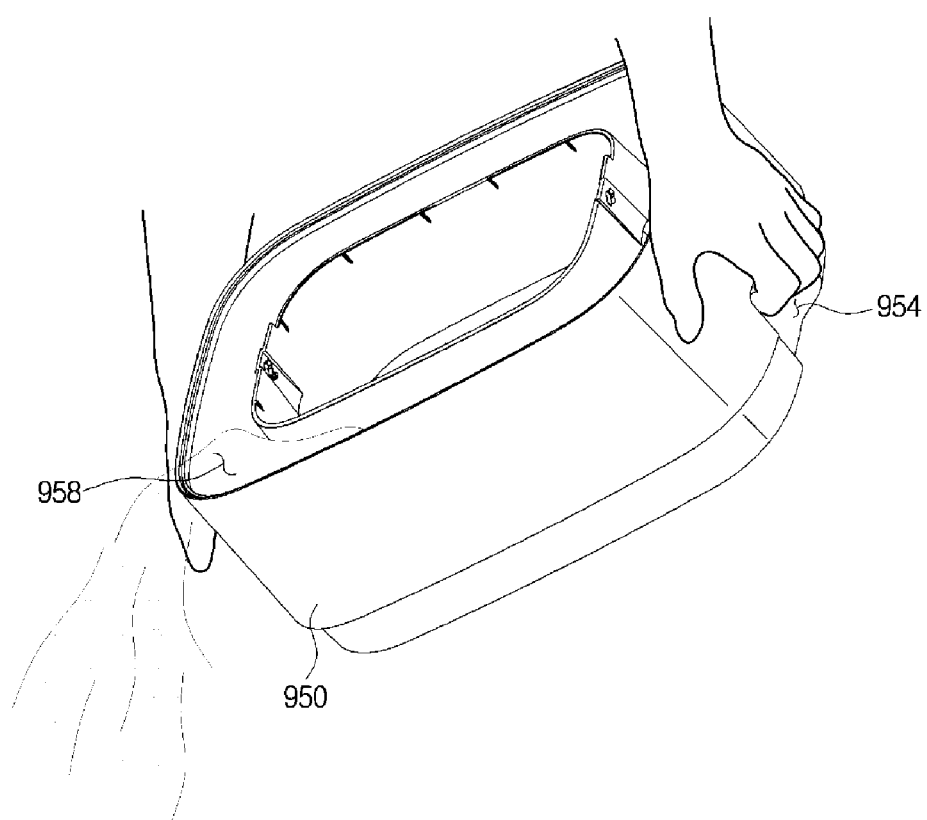

FIG. 37 is a perspective view of an external appearance of an appliance for dehumidification according to a sixth embodiment of the present disclosure, FIG. 38 illustrates a water container separated from a body of the appliance for dehumidification of FIG. 37, FIG. 39 is a side cross-sectional view of the appliance for dehumidification of FIG. 37, FIG. 40 is a plane view illustrating the water container of the appliance for dehumidification of FIG. 37, FIG. 41 illustrates the disassembled water container of the appliance for dehumidification of FIG. 37, FIG. 42 illustrates a state of an upper handle of the appliance for dehumidification of FIG. 37 upwardly rotated, FIG. 43 is a cross-sectional view along an I-I line of the water container of the appliance for dehumidification of FIG. 37, FIG. 44 and FIG. 45 shows motions of separating the water container and draining water by use of the upper handle, and FIG. 46 and FIG. 47 show motions of separating the water container and draining water by use of a side handle.

Referring to FIG. 37 to FIG. 47, the appliance for dehumidification according to a sixth embodiment of the present disclosure will be described. With respect to the structures that are identical to the previously described embodiments, the descriptions of the structures as such may be omitted for convenience purposes, while the structures as such may be applied equally.

The appliance for dehumidification 900 includes a body 910 having an inflow unit 915 and an outflow unit 916, a cooling cycle apparatus having a compressor 920 to compress refrigerant, a condenser 921 to condense the refrigerant and emit latent heat to an outside, an expansion valve (not shown) to expand the refrigerant, and an evaporator 922, or a cooling apparatus, absorb latent heat of an outside and to condense the vapor of the surrounding air, to a draft fan 925 configured to receive air from the inflow unit 915 and forcedly move the air to outflow through the outflow unit 916 after the inflow air is dehumidified through the evaporator 922 and then heated after passing through the condenser 921, a drain duct 930 to guide condensation water generated and descended from the evaporator 922, a water collecting tray 931 to collect the condensation water that is guided by the drain duct 930, a water container 950 detachably provided at an upper portion of the body 910 as to drain the condensation water, a pump 932 to pump the condensation water collected at the water collecting tray 931 to the water container 950, and a drain pipe 933 to guide the condensation water pumped by use of the pump 932 to the water container 950 at the upper portion of the body 910.

The body 910 of the appliance for dehumidification 900 may include a main case 911 having an accommodation space to accommodate various components, handles 912 to move the body 910 and a bottom case 913 coupled to a lower portion of the main case 911. The inflow unit 915 of the appliance for dehumidification 900 may be formed at a front of the body 910, and the outflow unit 916 may be formed at an upper portion of the main case 911.

The outflow unit 916 may be provided with a grill 916a to prevent foreign substances from penetrating to an inside, and the outflow unit 916 may be provided with a blade 917 to adjust the directions of the outflow air or to open/close the outflow unit 916. The blade 917 may be rotatively provided while having an rotational axis 917a as a center.

The cooling cycle apparatus having the compressor 920, the condenser 921, the expansion valve, and the evaporator 922 is provided at an inside the body 910. The compressor 920 may be disposed at a lower portion of the body 910, the evaporator 922 may be adjacently disposed with respect to the inflow unit 915, and the condenser 921 may be disposed at a rear of the evaporator 922.

The draft fan 925 may be rotated by receiving rotational force from a driving motor 925a. The draft fan 925, after having air inflow from a front of the body 910, may move the air outwardly toward an upper side of a front of the body 910 after the air is sequentially passed through the evaporator 922 and the condenser 921.

An inside of the body 910 may be provided with an air current guiding unit 926 to guide the current of air. An inside of the air current guiding unit 926 may be provided with a guide path 927. The draft fan 925 may be a centrifugal fan configured to outflow air in a radial direction after having the air inflow in an axial direction.

The condensation water condensed at the evaporator 922 may flow downward along the evaporator 922 and then may descend below the evaporator 922, and the drain duct 930 may be provided below the evaporator 922 to guide the descending condensation water.

The drain duct 930 is provided to guide condensation water to the water collecting tray 931, and for the above, the drain duct 930 may be inclined toward the water collecting tray 931. The drain duct 930 may be provided in a size capable of covering the entire area of the evaporator 922.

The water collecting tray 931 may store condensation water. A water level sensor (not shown) may be provided at the water collecting tray 931. When the water level of the water collecting tray 931 reaches a full level or at a certain level, the pump 932 is driven and the condensation water of the water collecting tray 931 may be pumped.

The drain duct 930 and the water collecting tray 931 may be separately formed, or may be integrally formed.

The water container 950 may be provided in a shape having a hollow hole 957. The hollow hole 957 may penetrate the water container 950 while extended from an upper end to a lower end of the water container 950. That is, the water container 950 may be formed in the shape of a ring when seen in a vertical direction. Here, the terminology "shape of a ring" refers to the shape having a hole formed at an inside thereof, and thus, the water container 950 according to the embodiment of the present disclosure may be adequate as long as the water container 950 is provided with a hole at an inside thereof, and the hole, in addition to the shape of a circle having a certain radius, may be an oval shape, a rectangular shape, a triangular shape, or other polygonal shapes.

In the embodiment of the present disclosure the water container 950 is formed in the shape of a ring having no disconnection, but is not limited hereto, and if the water container 950 is provided with the hollow hole 957, that water container 950 having the shape of a ring provided with a portion of the shape disconnected may be adequate.

More in detail, the water container 950 may be provided with an inner side wall 955 surrounding the hollow hole 957, and an outer side wall 953 provided at an outer side of the inner side wall 955 and forming an inside space 958 in which water is stored in between the inner side wall 953 and the outer side wall 953. The inner side wall 955 and the outer side wall 953 are both provided in the shape of a ring, and thus the inside space 958 in which water is stored may also be provided in the shape of a ring.

A lower end of the inner side wall 955 and a lower end of the outer side wall 953 may be connected by a bottom unit 952, and an upper end of the inner side wall 955 and an upper end of the outer side wall 953 may be open as to empty the water of the water container 950.

From another perspective, the water container 950 may include a ring-shaped water container body 951 having an upper surface thereof open and the hollow hole 957. The water container body 951 may be provided with the inner side wall 955 surrounding the hollow hole 957, the outer side wall 953 provided at an outer side of the inner side wall 955 and forming the inside space 958 in which water is stored in between the inner side wall 953 and the outer side wall 953, and the bottom unit 952 connecting a lower end of the inner side wall 955 and a lower end of the outer side wall 953.

The open upper surface of the water container body 951 may be open/closed by a cover 960. The cover 960 may be detachably coupled to the open upper surface of the water container body 951. The cover 960 may be formed in the shape of a ring having a hole 960a therein as to correspond in the shape of the water container body 951.

The water container 950 may be provided with a plurality of handles 961 and 954 for user convenience.

In detail, the water container 950 may be provided with the upper handle 961 rotatively provided at an upper portion, and the side handle 954 recessively provided at a side surface.

The upper handle 961 may be rotatively provided at the water container body 951. As one example, the upper handle 961 may be laid down when not being used, and in a case when the upper handle 961 is to be used, the upper handle 961 may be rotated in a direction of an arrow of FIG. 42.

For the above, the water container body 951 is provided with a handle coupling hole 956, and the upper handle 961 may be provided with a handle coupling bump 962 rotatively coupled to the handle coupling hole 956. The handle coupling hole 956 may be provided at an upper portion of the inner side wall 955 of the water container body 951. A user may mount the water container 950 at the body 910 or separate the water container 950 from the body 910 while holding the upper handle 961 using one hand, or may empty the water of the water container 950 by tilting the water container 950 (FIG. 44 and FIG. 45).

The side handle 954 may be recessively provided at a lower portion of the outer side wall 953 of the water container body 951. In detail, the side handle 954 may be structured with a upper finger supporting unit 954a bent from the outer side wall 953 toward the hollow hole 957, a side finger supporting unit 954b bent from the upper finger supporting unit 954a toward a lower side, and a finger space 954c to accommodate fingers (FIG. 43).

An upper portion of the body 910 may be provided with a water container mounting unit 940 (FIG. 38) at which the water container 950 is mounted. The water container 950 mounted at the water container mounting unit 940 may be positioned at a higher position than the evaporator 922, or may be positioned at least at an identical level with respect to the evaporator 922.

The water container mounting unit 940 may include a mounting space 941 at which the water container 950 is mounted, a bottom supporting unit 942 to support a lower end of the water container 950, and an outer side wall supporting unit 943 to support the outer side wall 953 of the water container 950.

The outer side wall supporting unit 943 may support the outer side wall 953 of the water container 950 while inserted into a step unit 953a recessively formed at a lower end of the outer side wall 953. The outer side wall supporting unit 943 may protrude toward an upper side at an edge unit of the water container mounting unit 940.

A drainage connecting port 970 (FIG. 39) may be provided at the water container mounting unit 940 such that the connecting of the water container 950 and the drain pipe 933 is easily performed at the time of mounting the water container 950, and that the separating of the water container 950 and the drain pipe 933 is easily performed at the time of separating the water container 950.

The drainage connecting port 970 at the time of mounting the water container 950 may be inserted into the inside space 958 of the water container 950. The water container 950 may be provided with a sealing member 971 of rubber material to guide the insertion of the drainage connecting port 970, as well as to seal between the water container 950 and the drainage connecting port 970.

In addition, the body 910 may be provided with a guide unit 980 upwardly protruded as to guide the mounting and the separating of the water container 950. The guide unit 980 may be upwardly protruded from a central portion of the body 910.

The guide unit 980 may be inserted into the hollow hole 957 of the water container 950. The guide unit 980 may support the inner side wall 955 of the water container 950 while inserted into the hollow hole 957 of the water container 950.

At the time of mounting the water container 950 at the body 910, the water container 950 is moved in a direction from an upper side to a lower side as to insert the guide unit 980 of the body 910 into the hollow hole 957 of the water container 950.

On the contrary, at the time of separating the water container 950 at the body 910, the water container 950 is moved in a direction from a lower side to an upper side as to release the guide unit 980 of the body 910 from the hollow hole 957 of the water container 950.

As the above, by having the guide unit 980 vertically inserted into the hollow hole 957 of the water container 950, the mounting and the separating of the water container 950 may be easily performed. In addition, an unexpected separation of the water container 950 in a process of moving the body 910 in a state that the water container 950 is mounted at the body 910 may be prevented.

An inside of the guide unit 980 may be provided with the guide path 927, which is described above. As the above, the space utilization of the appliance for dehumidification 900 may be increased as the guide path 927 is formed at the inside of the guide unit 980.

An upper surface 981 of the guide unit 980 may be exposed to an outside even in a state that the water container 950 is mounted. The upper surface 981 of the guide unit 980 may be provided with a display unit 982 (FIG. 38) to display a variety of motion information of the appliance for dehumidification 900, and a control unit 983 (FIG. 38) through which a variety of motion commands may be input at the appliance for dehumidification 900. The display unit 982 may be structured with a LCD panel having a segment 7 display apparatus. The control unit 983 may include one of more of various buttons, a knob, and a touch panel.

As the above, as the upper surface 981 of the guide unit 980 is provided with the display unit 982 and the control unit 983, a user may easily use the display unit 982 and the control unit 983 even in a state that the water container 950 is mounted at an upper portion of the body 910.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An appliance, comprising:
a body having an inflow unit and an outflow unit;
a fan to move air from the inflow unit to the outflow unit;
a heat-exchanging apparatus to generate condensation water by condensing vapor;
a water collecting tray to collect the condensation water generated at the heat-exchanging apparatus;
a water container detachably provided at an upper portion of the body as to store the condensation water;
a pump to pump the condensation water from the water collecting tray to the water container; and
a drain pipe to guide the condensation water pumped by the pump to the water container.

2. The appliance of claim 1, wherein:
the heat-exchanging apparatus comprises an evaporator to cool air by evaporating refrigerant.

3. The appliance of claim 1, further comprising:
adsorbent material to adsorb water, and a heater to heat the air to vaporize the water adsorbed at the adsorbent material.

4. The appliance of claim 1, wherein:
the water container is positioned higher than or at least at an identical level as the heat-exchanging apparatus.

5. The appliance of claim 1, comprising:
a water container mounting unit provided at an upper portion of the body as to mount the water container.

6. The appliance of claim 5, comprising:
a drainage connecting port provided at the water container mounting unit, connected to the water container when the water container is mounted at the water container mounting unit, and separated from the water container when the water container is not connected to the water container mounting unit.

7. The appliance of claim 6, wherein:
the drainage connecting port is moved into a first retracted open position by the water container when the water container is being mounted to the water container mounting unit, and a second, protruding, closed position when the water container is separated from the water container mounting unit.

8. The appliance of claim 6, comprising:
an elastic member to elastically bias the drainage connecting port toward the second position.

9. The appliance of claim 6, wherein:
the drainage connecting port comprises a contact surface that narrows outwardly, the contact surface being pressed by the water container when the port is in the first position.

10. The appliance of claim 6, wherein:
the drainage connecting port comprises a stopper unit to limit the second position.

11. The appliance of claim 6, wherein:
the drainage connecting port is provided at a side of a side wall unit of the water container, and an inlet unit through which the condensation water supplied through the drainage connecting port enters an inside space of the water container is formed at the side wall unit of the water container.

12. The appliance of claim 1, wherein:
the drain pipe comprises an outside extension pipe extending toward an upper direction of the water container after being extended from an outer side of a side of the water container in an upper side direction.

13. The appliance of claim 11, wherein:
the outside extension pipe comprises a reverse U-shaped pipe.

14. The appliance of claim 13, wherein:
the drain pipe comprises a coupling pipe having a drainage pipe coupling unit to which the reverse U-shaped pipe is coupled.

15. The appliance of claim 14, further comprising:
a second drain pipe coupled to the drainage coupling unit of the coupling pipe to interchange with the reverse U-shaped pipe, and to drain the condensation water to an outside of the water container.

16. The appliance of claim 12, wherein:
one end portion of the outside extension pipe is positioned at a side of an upper wall unit of the water container, and an inlet unit through which the condensation water supplied through the outside extension pipe enters an inside space of the water container is formed at the upper wall unit of the water container.

17. The appliance of claim 5, wherein:
the drain pipe comprises an inside extension pipe protruded from the water container mounting unit to an upper side and penetrated through a bottom unit of the water container so as to guide the condensation water to an inside space of the water container.

18. The appliance of claim 17, wherein:
an inlet unit though which the inside extension pipe is penetrated is formed at the bottom unit of the water container.

19. The appliance of claim 18, wherein:
the bottom unit of the water container comprises a bulge unit bulged toward an upper side, and the inlet unit is formed at the bulge unit.

20. The appliance of claim 18, comprising:
a seal between the inlet unit and the inside extension pipe.

21. The appliance of claim 17, wherein:
the water container mounting unit comprises a mounting space at which the water container is mounted, and a lower supporting unit to support the bottom unit of the water container.

22. The appliance of claim 11, wherein:
the water container mounting unit comprises a side wall supporting unit to support the side wall unit of the water container.

23. The appliance of claim 17, wherein:
the water container comprises a noise preventing rib configured to prevent the condensation water from directly descending toward the bottom of the water container by having the condensation water flow along the noise preventing rib.

24. An appliance, comprising:
a body;
a fan to move air in the body;
a heat-exchanging apparatus to condense vapor provided in the air;
a humidification device to humidify the air by vaporizing humidification water; a water collector located below both the heat-exchanging apparatus and the humidification device to collect at least condensation water generated from the heat-exchanging apparatus; and
a combined water container fluidly connected to the water collector to store the condensation water generated during a dehumidification mode and to store humidification water to be supplied to the humidification device during a humidification mode,
wherein the entire combined water container is detachably provided above both the heat-exchanging apparatus and the humidification device.

25. The appliance of claim 24, wherein:
the humidification water of the combined water container is supplied to the humidification device by a weight of the humidification water.

26. The appliance of claim 24, comprising:
a humidification water supplying path to guide the humidification water of the combined water container to the humidification device, to close during the dehumidification mode and to open during the humidification mode.

27. The appliance of claim 26, wherein:
the combined water container is mounted at a combined water container mounting unit of the body in a plurality of directions, and when the combined water container is mounted toward a first direction of the plurality of directions, the humidification water supplying path is closed, and when the combined water container is mounted toward a second direction of the plurality of directions, the humidification water supplying path is open.

28. The appliance of claim 27, wherein:
the combined water container comprises a humidification water outflow unit forming at least a portion of the humidification water supplying path;
a movable opening/closing member to open/close the humidification water outflow unit; and
an elastic member to elastically bias the opening/closing member toward a direction to close the humidification water outflow unit.

29. The appliance of claim 28, comprising:
a bump provided at the combined water container mounting unit of the body to press the opening/closing member toward a direction in which the humidification water outflow unit is open.

30. The appliance of claim 26, comprising:
an automatic or a manual opening/closing valve provided at the humidification water supplying path to open/close the humidification water supplying path.

31. The appliance of claim 24, wherein:
the humidification device comprises at least one of a humidifying filter to absorb the humidification water, a heater to heat the humidification water, or an ultrasonic vibrator to vibrate the humidification water.

32. An appliance, comprising:
a body;
a heat-exchanging apparatus to generate condensation water by condensing vapor;
a guide unit projecting from an upper portion of the body; and
a water container detachably mounted at the upper portion of the body and having a through-hole substantially corresponding to an outer surface of the guide unit,
wherein the guide unit receives the through-hole therearound to guide the water container when being mounted on the body and when being separated from the body.

33. The appliance of claim 32, wherein:
the water container is provided with an inner side wall defining the through-hole.

34. The appliance of claim 33, wherein:
the guide unit of the body supports the inner side wall of the water container.

35. The appliance of claim 33, wherein:
the water container is provided with an outer side wall provided at an outer side of the inner side wall to form a space between the outer side wall and the inner side wall in which the condensation water is stored.

36. The appliance of claim 32, wherein:
the water container is provided in the shape of a ring.

37. The appliance of claim 32, wherein:
a guide path to guide air is formed at an inside of the guide unit.

38. The appliance of claim 32, wherein:
an outflow unit through which air flows outwardly of the body is formed at an upper surface of the guide unit.

39. The appliance of claim 32, wherein:
a display unit is provided at an upper surface of the guide unit.

40. The appliance of claim 32, wherein:
a control unit is provided at an upper surface of the guide unit.

41. The appliance of claim 32, wherein:
the water container comprises a body, and a handle rotatively coupled to an upper portion of the body of the water container.

42. The appliance of claim 32, wherein:
the water container comprises a body, and a side handle recessively formed at a side surface of the body of the water container.

* * * * *